United States Patent
Stuttard et al.

(10) Patent No.: US 7,802,079 B2
(45) Date of Patent: Sep. 21, 2010

(54) PARALLEL DATA PROCESSING APPARATUS

(75) Inventors: Dave Stuttard, Bristol (GB); Dave Williams, Emerson Green (GB); Eamon O'Dea, Bristol (GB); Gordon Faulds, Dursley (GB); John Rhoades, Durham, NC (US); Ken Cameron, Bristol (GB); Phil Atkin, Slough (GB); Paul Winser, Bristol (GB); Russell David, Wilshire (GB); Ray McConnell, Clifton (GB); Tim Day, Edinburgh (GB); Trey Greer, Chapel Hill, NC (US)

(73) Assignee: Clearspeed Technology Limited, Bristol (GB)

( * ) Notice: Subject to any disclaimer, the term of this patent is extended or adjusted under 35 U.S.C. 154(b) by 377 days.

(21) Appl. No.: 11/772,079

(22) Filed: Jun. 29, 2007

(65) Prior Publication Data
US 2008/0034186 A1    Feb. 7, 2008

Related U.S. Application Data

(62) Division of application No. 09/972,797, filed on Oct. 9, 2001, now Pat. No. 7,363,472.

(51) Int. Cl.
*G06F 9/00* (2006.01)
*G06F 15/76* (2006.01)

(52) U.S. Cl. .................. 712/225; 712/22; 712/216; 712/217

(58) Field of Classification Search .................. 712/14, 712/22, 216, 217, 225
See application file for complete search history.

(56) References Cited

U.S. PATENT DOCUMENTS

| | | | |
|---|---|---|---|
| 4,229,790 | A | 10/1980 | Gilliland et al. |
| 4,316,245 | A | 2/1982 | Luu et al. |
| 4,374,409 | A | 2/1983 | Bienvenu et al. |
| 4,395,757 | A | 7/1983 | Bienvenu et al. |
| 4,435,758 | A | 3/1984 | Lorie et al. |
| 4,484,273 | A | 11/1984 | Stiffler et al. |
| 4,538,226 | A | 8/1985 | Hori |
| 4,590,465 | A | 5/1986 | Fuchs |
| 4,602,328 | A | 7/1986 | Finger et al. |
| 4,739,476 | A | 4/1988 | Fiduccia |
| 4,754,398 | A | 6/1988 | Pribnow |
| 4,835,729 | A | 5/1989 | Morton |

(Continued)

FOREIGN PATENT DOCUMENTS

EP    035647 A2    9/1981

(Continued)

OTHER PUBLICATIONS

Sharangpani, Harash. "Intel® Itanium™ Processor Microarchitecture Overview". Intel Microprocessor Forum, © Oct. 5-6, 1999.*

(Continued)

*Primary Examiner*—Aimee J Li
(74) *Attorney, Agent, or Firm*—Michael A. Glenn; Glenn Patent Group

(57) ABSTRACT

A parallel data processing apparatus using a SIMD array of processing elements is disclosed. The apparatus makes use of a register in order to control issuance of instructions to the processing elements in the array.

3 Claims, 17 Drawing Sheets

U.S. PATENT DOCUMENTS

| | | | |
|---|---|---|---|
| 4,885,715 A | | 12/1989 | Evans et al. |
| 4,907,148 A | | 3/1990 | Morton |
| 4,939,638 A | | 7/1990 | Stephenson et al. |
| 4,970,724 A | | 11/1990 | Yung |
| 4,972,314 A | * | 11/1990 | Getzinger et al. ............ 711/149 |
| 4,985,832 A | | 1/1991 | Grondalski |
| 5,038,282 A | | 8/1991 | Gilbert et al. |
| 5,050,065 A | | 9/1991 | Dartois et al. |
| 5,081,575 A | | 1/1992 | Hiller et al. |
| 5,113,523 A | | 5/1992 | Colley et al. |
| 5,127,104 A | | 6/1992 | Dennis |
| 5,129,077 A | | 7/1992 | Hillis |
| 5,151,969 A | | 9/1992 | Petsche |
| 5,159,686 A | | 10/1992 | Chastain et al. |
| 5,165,023 A | | 11/1992 | Gifford |
| 5,175,858 A | | 12/1992 | Hammerstrom |
| 5,185,872 A | * | 2/1993 | Arnold et al. ................ 712/217 |
| 5,212,777 A | | 5/1993 | Gove et al. |
| 5,230,079 A | | 7/1993 | Grondalski |
| 5,239,654 A | * | 8/1993 | Ing-Simmons et al. ......... 712/20 |
| 5,247,689 A | | 9/1993 | Ewert |
| 5,257,359 A | | 10/1993 | Blasco et al. |
| 5,276,886 A | | 1/1994 | Dror |
| 5,276,895 A | | 1/1994 | Grondalski |
| 5,339,447 A | * | 8/1994 | Balmer ......................... 377/82 |
| 5,371,896 A | | 12/1994 | Gove et al. |
| 5,392,385 A | | 2/1995 | Evangelisti et al. |
| 5,404,478 A | | 4/1995 | Arai et al. |
| 5,408,671 A | | 4/1995 | Tanaka |
| 5,410,727 A | * | 4/1995 | Jaffe et al. ................... 709/234 |
| 5,437,045 A | | 7/1995 | Davies |
| 5,442,762 A | | 8/1995 | Kato et al. |
| 5,457,779 A | | 10/1995 | Harrell |
| 5,475,856 A | | 12/1995 | Kogge |
| 5,481,669 A | | 1/1996 | Poulton et al. |
| 5,487,022 A | * | 1/1996 | Simpson et al. ............. 708/205 |
| 5,522,080 A | | 5/1996 | Harney |
| 5,522,083 A | * | 5/1996 | Gove et al. .................... 712/22 |
| 5,535,410 A | | 7/1996 | Watanabe et al. |
| 5,606,683 A | | 2/1997 | Riordan |
| 5,625,836 A | * | 4/1997 | Barker et al. ................ 709/214 |
| 5,630,160 A | * | 5/1997 | Simpson et al. ............. 708/490 |
| 5,634,107 A | | 5/1997 | Yumoto et al. |
| 5,649,135 A | | 7/1997 | Pechanek et al. |
| 5,652,833 A | | 7/1997 | Takizawa et al. |
| 5,652,872 A | | 7/1997 | Richter et al. |
| 5,664,214 A | | 9/1997 | Taylor et al. |
| 5,673,407 A | * | 9/1997 | Poland et al. ................ 712/222 |
| 5,710,935 A | * | 1/1998 | Barker et al. .................. 712/20 |
| 5,717,943 A | * | 2/1998 | Barker et al. .................. 712/20 |
| 5,717,947 A | | 2/1998 | Gallup et al. |
| 5,734,921 A | * | 3/1998 | Dapp et al. .................... 712/10 |
| 5,740,463 A | | 4/1998 | Oshima et al. |
| 5,745,778 A | | 4/1998 | Alfieri |
| 5,752,031 A | | 5/1998 | Cutler et al. |
| 5,752,068 A | | 5/1998 | Gilbert |
| 5,765,011 A | | 6/1998 | Wilkinson et al. |
| 5,796,385 A | | 8/1998 | Rich |
| 5,805,915 A | * | 9/1998 | Wilkinson et al. ............ 712/20 |
| 5,808,690 A | | 9/1998 | Rich |
| 5,815,723 A | | 9/1998 | Wilkinson et al. |
| 5,825,921 A | | 10/1998 | Dulong |
| 5,828,894 A | | 10/1998 | Wilkinson |
| 5,831,625 A | | 11/1998 | Rich et al. |
| 5,835,925 A | | 11/1998 | Kessler et al. |
| 5,850,489 A | | 12/1998 | Rich |
| 5,892,517 A | | 4/1999 | Rich |
| 5,923,338 A | | 7/1999 | Rich |
| 5,933,131 A | | 8/1999 | Rich |
| 5,949,426 A | | 9/1999 | Rich |
| 5,978,838 A | | 11/1999 | Mohamed et al. |
| 6,016,395 A | | 1/2000 | Mohamed |
| 6,055,579 A | | 4/2000 | Goyal et al. |
| 6,070,003 A | * | 5/2000 | Gove et al. ................... 710/317 |
| 6,104,842 A | | 8/2000 | Rich |
| 6,108,460 A | | 8/2000 | Rich |
| 6,112,019 A | * | 8/2000 | Chamdani et al. ........... 712/214 |
| 6,131,151 A | | 10/2000 | Graef |
| 6,154,225 A | | 11/2000 | Kou et al. |
| 6,173,389 B1 | | 1/2001 | Pechanek et al. |
| 6,259,460 B1 | | 7/2001 | Gossett et al. |
| 6,260,088 B1 | * | 7/2001 | Gove et al. ................... 710/100 |
| 6,266,759 B1 | | 7/2001 | Birrittella |
| 6,304,955 B1 | * | 10/2001 | Arora ......................... 712/217 |
| 6,308,252 B1 | | 10/2001 | Agarwal et al. |
| 6,311,261 B1 | * | 10/2001 | Chamdani et al. ............. 712/23 |
| 6,697,063 B1 | | 2/2004 | Zhu |
| 7,363,472 B2 | | 4/2008 | Stuttard et al. |
| 7,447,873 B1 | | 11/2008 | Nordquist |
| 7,506,136 B2 | * | 3/2009 | Stuttard et al. ................ 712/22 |
| 2007/0226458 A1 | * | 9/2007 | Stuttard et al. ................ 712/22 |
| 2008/0008393 A1 | | 1/2008 | Stuttard et al. |
| 2008/0034185 A1 | * | 2/2008 | Stuttard et al. ................ 712/22 |
| 2008/0040575 A1 | * | 2/2008 | Stuttard et al. ................ 712/22 |
| 2008/0052492 A1 | * | 2/2008 | Stuttard et al. ................ 712/22 |
| 2009/0006773 A1 | | 1/2009 | Yamaguchi et al. |
| 2009/0198898 A1 | | 8/2009 | Stuttard et al. |

FOREIGN PATENT DOCUMENTS

| | | |
|---|---|---|
| EP | 113612 A2 | 7/1984 |
| EP | 268342 | 5/1988 |
| EP | 277262 | 8/1988 |
| EP | 314277 A2 | 5/1989 |
| EP | 328721 A2 | 8/1989 |
| EP | 351556 A2 | 1/1990 |
| EP | 380098 A2 | 8/1990 |
| EP | 422965 | 4/1991 |
| EP | 0428327 A1 | 5/1991 |
| EP | 447146 A2 | 9/1991 |
| EP | 463721 A2 | 1/1992 |
| EP | 543560 A2 | 5/1993 |
| EP | 544127 A2 | 6/1993 |
| EP | 0570950 A2 | 11/1993 |
| EP | 570952 A2 | 11/1993 |
| EP | 588341 A2 | 3/1994 |
| EP | 602909 A2 | 6/1994 |
| EP | 638867 | 2/1995 |
| EP | 638868 A2 | 2/1995 |
| EP | 690384 A2 | 1/1996 |
| EP | 696001 | 2/1996 |
| EP | 726529 A2 | 8/1996 |
| EP | 973099 A2 | 1/2000 |
| GB | 2062915 | 5/1981 |
| GB | 2074351 | 10/1981 |
| GB | 2078407 | 1/1982 |
| GB | 2216306 | 10/1989 |
| GB | 2273377 | 6/1994 |
| GB | 2286909 | 8/1995 |
| GB | 2287559 A | 9/1995 |
| JP | 03132861 | 6/1991 |
| JP | 070013956 | 1/1995 |
| JP | 090288652 | 11/1997 |
| WO | WO 90/16031 | 12/1990 |
| WO | WO 91/10200 | 7/1991 |
| WO | WO 92/07335 | 4/1992 |
| WO | WO 92/15061 | 9/1992 |
| WO | WO 94/11815 | 5/1994 |
| WO | WO 96/08778 | 3/1996 |
| WO | WO 96/41250 | 12/1996 |
| WO | WO 98/35301 A2 | 8/1998 |
| WO | WO 99/19807 | 4/1999 |
| WO | WO 99/53411 A2 | 10/1999 |
| WO | WO 99/53412 | 10/1999 |

| WO | WO 99/53413 | 10/1999 |
| WO | WO 00/22515 | 4/2000 |
| WO | WO 00/62182 | 10/2000 |

OTHER PUBLICATIONS

Espasa, et al.; "Simultaneous Multithreaded Vector Architecture: Merging ILP and DLP for High Performance"; 1997; IEEE, pp. 350-357.

Espasa, et al.; "Exploiting Instruction-and Data-Level Parallelism"; 1997, IEEE, pp. 20-27.

Espasa, et al; "Multithreaded Vector Architectures"; 1997; IEEE, pp. 237-248.

Harrell, et al.; "Graphics Rendering Architecture for a High Performance Desktop Workstation"; 1993; ACM, pp. 93-100.

Limousin, et al.; "Improving 3D Geometry Transformations on a Simultaneous Multithreaded SIMD Processor"; 2001, ACM, pp. 236-245.

Salami, et al.; "An Evaluation of Different DLP Alternatives for the Embedded Media Domain"; Nov. 1999; 1st Workshop on Media Processors and DSPs (MPDSP-1), 10 pages.

Weems, Charles; "Asynchronous SIMD: An Architectural Concept for High Performance Image Processing"; Oct. 20-22, 1997; Proceedings fourth IEEE Int'l Workshop on Computer Architecture for Machine Preception, pp. 235-242.

Jeng et al; "A Fault-tolerant multistage interconnection network for multiprocessor systems using dynamic redundancy"; copyright 1986 IEEE; 6th International Conference on Distributed Computing Systems Proceedings; pp. 70-77; see INSPEC abstract No. C86052412.

Bursky, Dave; "ISSCC: Digital Technology"; Feb. 21, 1994; Electronic Design, pp. 69-83.

Bailey, David; "Anatomy of a DOS Extender"; Jul. 1989; EXE Magazine, vol. 4, Issue 2, pp. 56-59.

Eyles, et al.: "PixelFlow™ The Realization"; Hewlett-Packard Co. chapel Hill Graphics Lab and Dept. of Computer Science Univ. of North Carolina.

Eyles, et al.; "PixelFlow™ Rasterizer Functional Description"; Nov. 20, 1997; Dept. of Computer Science Univ. of North Carolina at Chapel Hill.

Petzold, Charles; Environments "OS/2 and the 386: They Should Have Been Made for Each Other"; Jan. 16, 1990; PC Magazine, pp. 303-308.

Rennels, David A.; "On Implementing Fault-Tolerance in Binary Hypercubes"; 1986; IEEEE, International Symposium on Fault-Tolerant Computer Systems (FTCS), vol. SYMP Pt. 16, pp. 344-349.

Sernec, et al.; "Multithreaded Systolic/SIMD DSP Array Processor—MUS2DAP"; Nov. 3-5, 1997; IEEE Workshop on Signal Processing Systems, pp. 448-457.

Shigei, et al; "On Efficient Spare Arrangements and an Algorithm with Relocating Spares for Reconfiguring Processor Arrays"; Jun. 1997; IEICE Trans. Fundamentals, vo. E80-A, No. 6 pp. 988-995.

Shu, et al.; "A Reliable Design of Parallel Processor Systems"; 1987; Proceedings of the 1987 International Conference on Parallel Processing; pp. 882-884.

Tucker, et al.; "Architecture and Applications of the Connection Machine"; Aug. 1988; Computer—IEEE Computer Society, vo. 21, part 8, pp. 26-38.

Alaghband, Gita; "SIMD Architectures"; Fall 1997; Obtained via http://carbon.cudenver.edu/%7Egalgahba/simd.html.

Computer Dictionary, Microsft Press, 3rd edition, 1997, p. 467.

* cited by examiner

PARALLEL DATA PROCESSING APPARATUS

CROSS REFERENCE TO RELATED APPLICATIONS

This application is a divisional of U.S. patent application Ser. No. 09/972,797, entitled Parallel Data Processing Apparatus, filed Oct. 9, 2001 now U.S. Pat. No. 7,363,472 which is incorporated herein in its entirety by this reference thereto.

BACKGROUND OF THE INVENTION

1. Technical Field

The present invention relates to parallel data processing apparatus, and in particular to SIMD (single instruction multiple data) processing apparatus.

2. Description of the Related Art

Increasingly, data processing systems are required to process large amounts of data. In addition, users of such systems are demanding that the speed of data processing is increased. One particular example of the need for high speed processing of massive amounts of data is in the computer graphics field. In computer graphics, large amounts of data are produced that relate to, for example, geometry, texture, and colour of objects and shapes to be displayed on a screen. Users of computer graphics are increasingly demanding more lifelike and faster graphical displays which increase the amount of data to be processed and increase the speed at which the data must be processed.

A previously proposed processing architecture for processing large amounts of data in a computer system uses a Single Instruction Multiple Data (SIMD) array of processing elements. In such an array all of the processing elements receive the same instruction stream, but operate on different respective data items. Such an architecture can thereby process data in parallel, but without the need to produce parallel instruction streams. This can be an efficient and relatively simple way of obtaining good performance from a parallel processing machine.

However, the SIMD architecture can be inefficient when a system has to process a large number of relatively small data item groups. For example, for a SIMD array processing data relating to a graphical display screen, for a small graphical primitive such as a triangle, only relatively few processing elements of the array will be enabled to process data relating to the primitive. In that case, a large proportion of the processing elements may remain unused while data is being processed for a particular group.

It is therefore desirable to produce a system which can overcome or alleviate this problem.

SUMMARY OF THE INVENTION

Various aspects of the present invention are exemplified by the attached claims.

DESCRIPTION OF THE PREFERRED EMBODIMENT

The data processing system described below is a graphics data processing system for producing graphics images for display on a screen. However, this embodiment is purely exemplary, and it will be readily apparent that the techniques and architecture described here for processing graphical data are equally applicable to other data types, such as video data. The system is of course applicable to other signal and/or data processing techniques and systems.

An overview of the system will be given, followed by brief descriptions of the various functional units of the system. A graphics processing method will then be described by way of example, followed by detailed description of the functional units.

Overview

Figure 1:
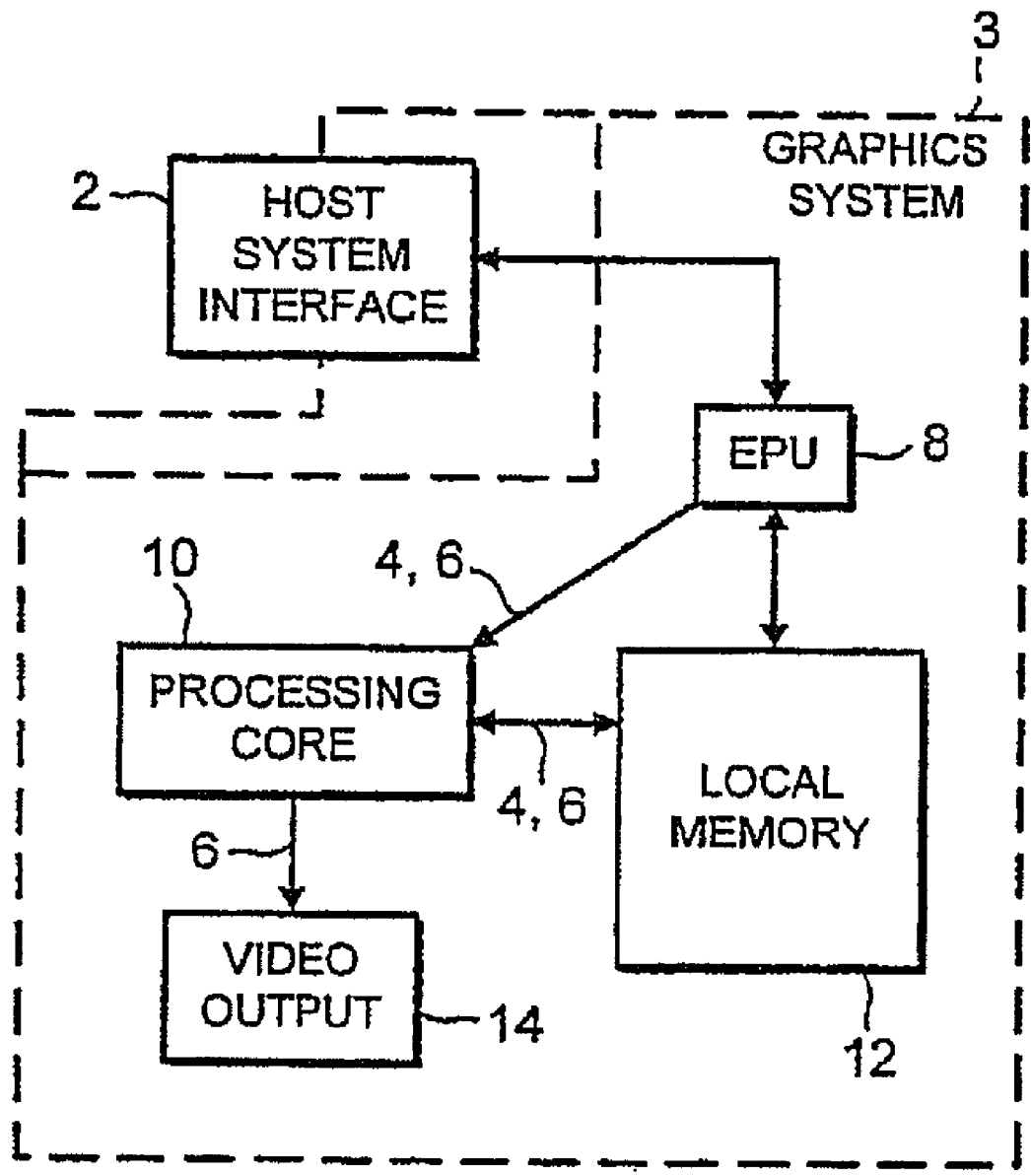
FIG. 1 is a block diagram illustrating a graphics data processing system.

FIG. 1 is a system level block diagram illustrating a graphics data processing system 3. The system 3 interfaces with a host system (not shown), such as a personal computer or workstation, via an interface 2. Such a system can be provided with an embedded processor unit (EPU) for control purposes. For example, the specific graphics system 3 includes an embedded processing unit (EPU) 8 for controlling the overall function of the graphics processor and for interfacing with the host system. The system includes a processing core 10 which processes the graphical data for output to the display screen via a video output interface 14. Local memory 12 is provided for the graphics system 3.

Such a data processing unit can be connected for operation to a host system or could provide a stand alone processing system, without the need for a specific host system. Examples of such application include a "set top box" for receiving and decoding digital television and Internet signals.

Figure 2A:
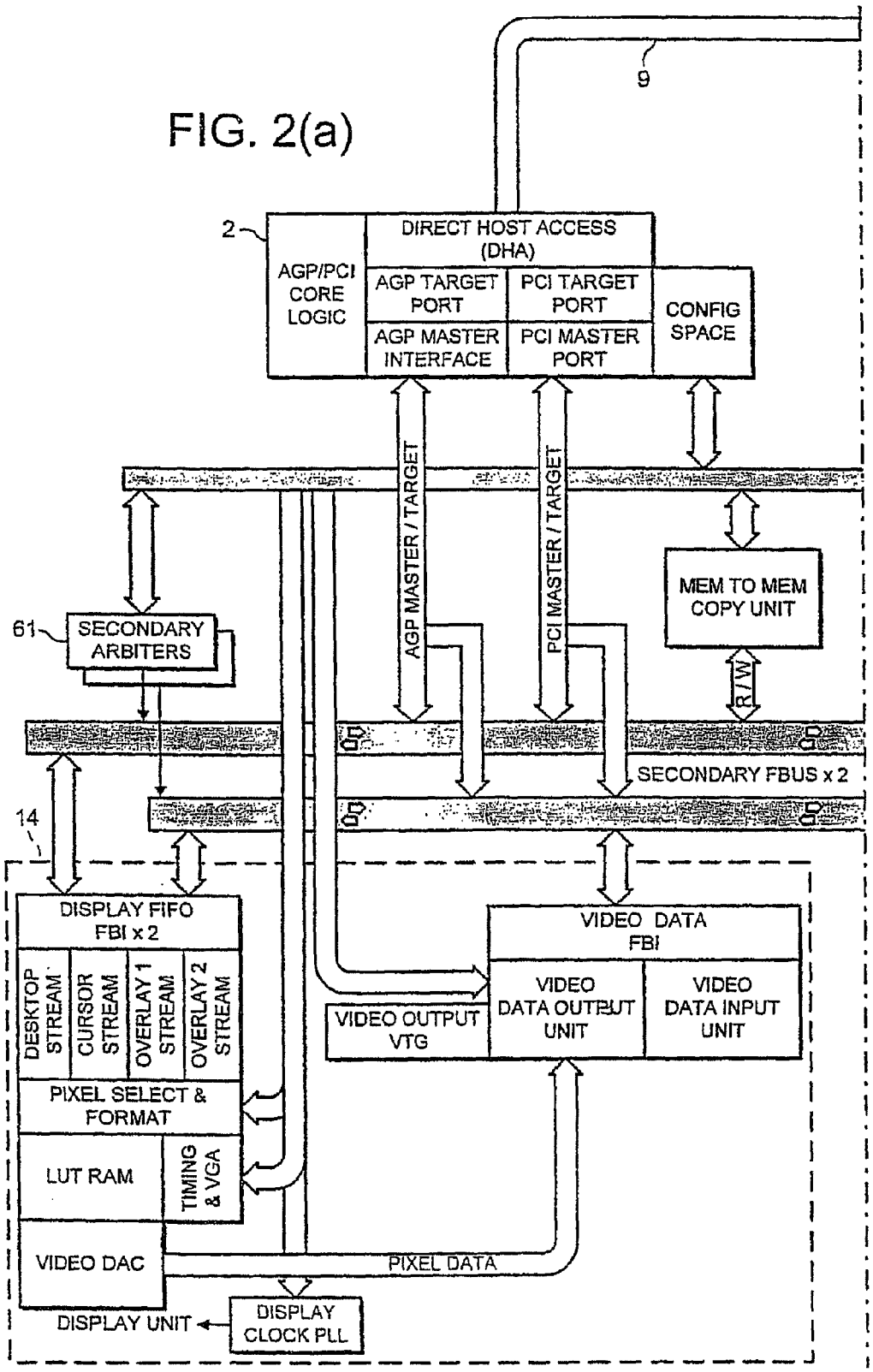
FIG. 2 is a more detailed block diagram illustrating the graphics data processing system of FIG. 1.
Figure 2B:
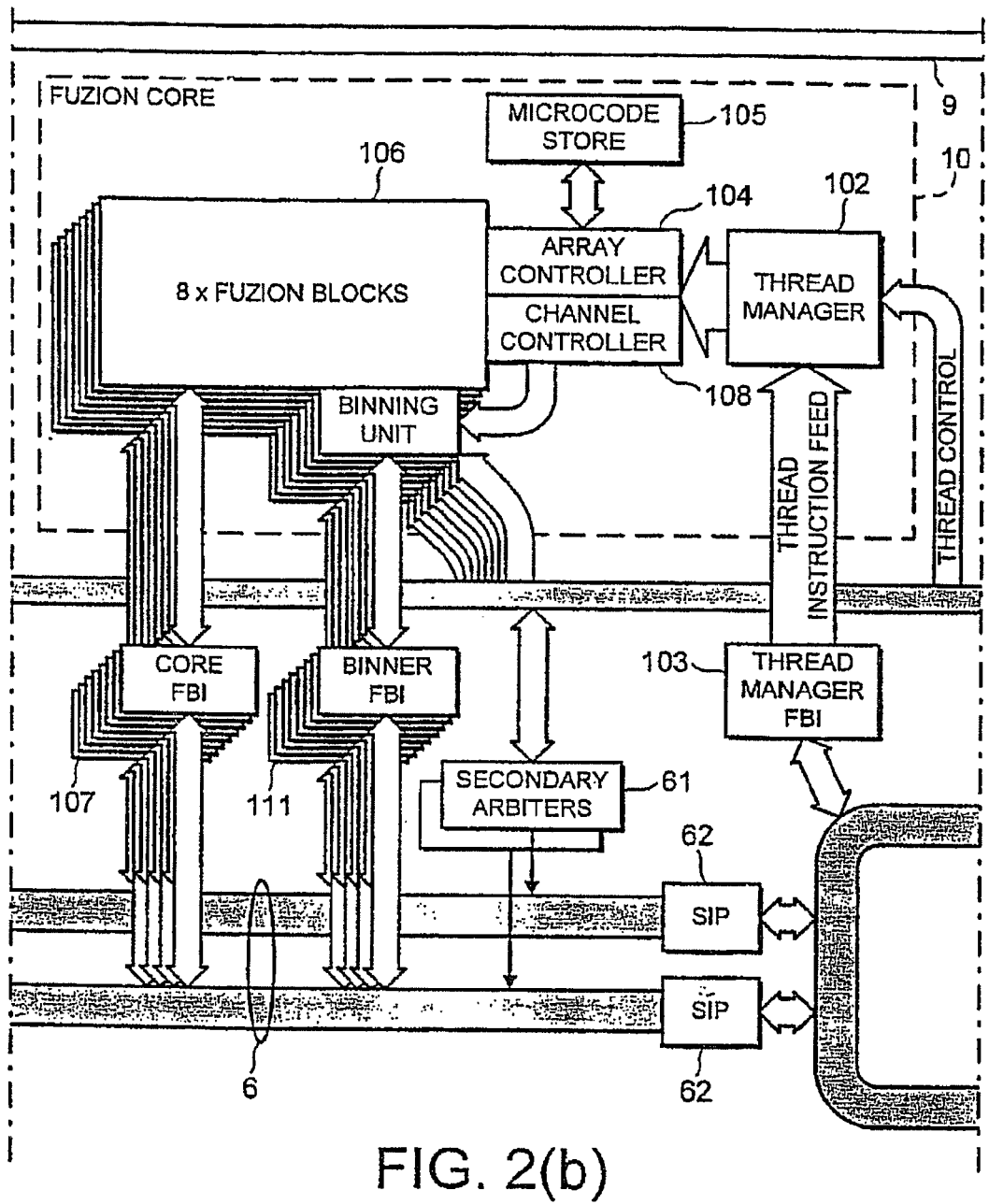
Figure 2C:
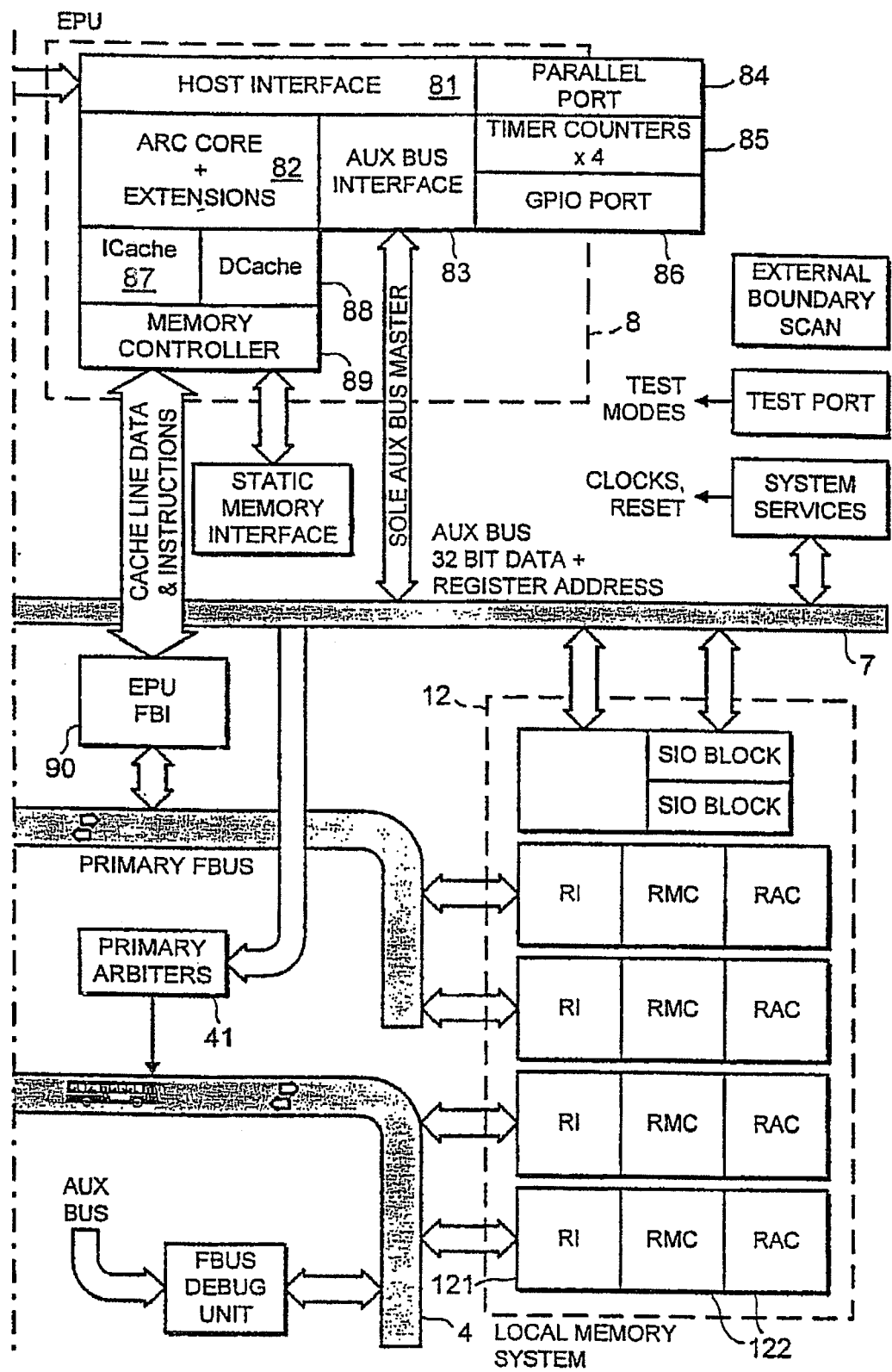

FIG. 2 illustrates the graphics processing system in more detail. In one particular example, the graphics system connects to the host system via an advanced graphics port (AGP) or PCI interface 2. The PCI interface and AGP 2 are well known.

The host system can be any type of computer system, for example, a PC 99 specification personal computer or a workstation.

The AGP 2 provides a high bandwidth path from the graphics system to host system memory. This allows large texture databases to be held in the host system memory, which is generally larger than local memory associated with the graphics system. The AGP also provides a mechanism for mapping memory between a linear address space on the graphics system and a number of potentially scattered memory blocks in the host system memory. This mechanism is performed by a graphics address re-mapping table (GART) as is well known.

The graphics system described below is preferably implemented as a single integrated circuit which provides all of the functions shown in FIG. 1. However, it will be readily apparent that the system may be provided as a separate circuit card carrying several different components, or as a separate chipset provided on the motherboard of the host, or integrated with the host central processing unit (CPU), or in any suitable combination of these and other implementations.

The graphics system includes several functional units which are connected to one another for the transfer of data by way of a dedicated bus system. The bus system preferably includes a primary bus 4 and a secondary bus 6. The primary bus is used for connection of latency intolerant devices, and the secondary bus is used for connection of latency tolerant devices. The bus architecture is preferably as described in detail in the Applicant's co-pending UK patent applications, particularly GB 9820430.8. It will be readily appreciated that any number of primary and secondary buses can be provided in the bus architecture in the system. The specific system shown in FIG. 2 includes two secondary buses.

Referring mainly to FIG. 2, access to the primary bus 4 is controlled by a primary arbiter 41, and access to the secondary buses 6 by a pair of secondary arbiters 61. Preferably, all data transfers are in packets of 32 bytes each. The secondary buses 6 are connected with the primary bus 4 by way of respective interface units (SIP) 62.

An auxiliary control bus 7 is provided in order to enable control signals to be communicated to the various units in the system.

The AGP/PCI interface is connected to the graphics system by way of the secondary buses 6. This interface can be connected to any selection of the secondary buses, in the example shown, to both secondary buses 6. The graphics system also includes an embedded processing unit (EPU) 8 which is used to control operation of the graphics system and to communicate with the host system. The host system has direct access to the EPU 8 by way of a direct host access interface 9 in the AGP/PCI 2. The EPU is connected to the primary bus 4 by way of a bus interface unit (EPU FBI) 90.

Also connected to the primary bus is a local memory system 12. The local memory system 12 includes a number, in this example four, of memory interface units 121 which are used to communicate with the local memory itself. The local memory is used to store various information for use by the graphics system.

The system also includes a video interface unit 14 which comprises the hardware needed to interface the graphics system to the display screen (not shown), and other devices for exchange of data which may include video data. The video interface unit is connected to the secondary buses 6, via bus interface units (FBI).

The graphics processing capability of the system is provided by a processing core 10. The core 10 is connected to the secondary buses 6 for the transfer of data, and to the primary bus 4 for the transfer of instructions. As will be explained in more detail below, the secondary bus connections are made by a core bus interface (Core FBI) 107, and a binner bus interface (Binner FBI) 111, and the primary bus connection is made by a thread manager bus interface (Thread Manager FBI) 103.

As will be explained in greater detail below, the processing core 10 includes a number of control units: thread manager 102, array controller 104, channel controller 108, a binning unit 1069 per block and a microcode store 105. These control units control the operation of a number of processing blocks 106 which perform the graphics processing itself.

In the example shown in FIG. 2, the processing core 10 is provided with eight processing blocks 106. It will be readily appreciated that any number of processing blocks can be provided in a graphics system using this architecture.

Processing Core

Figure 3:
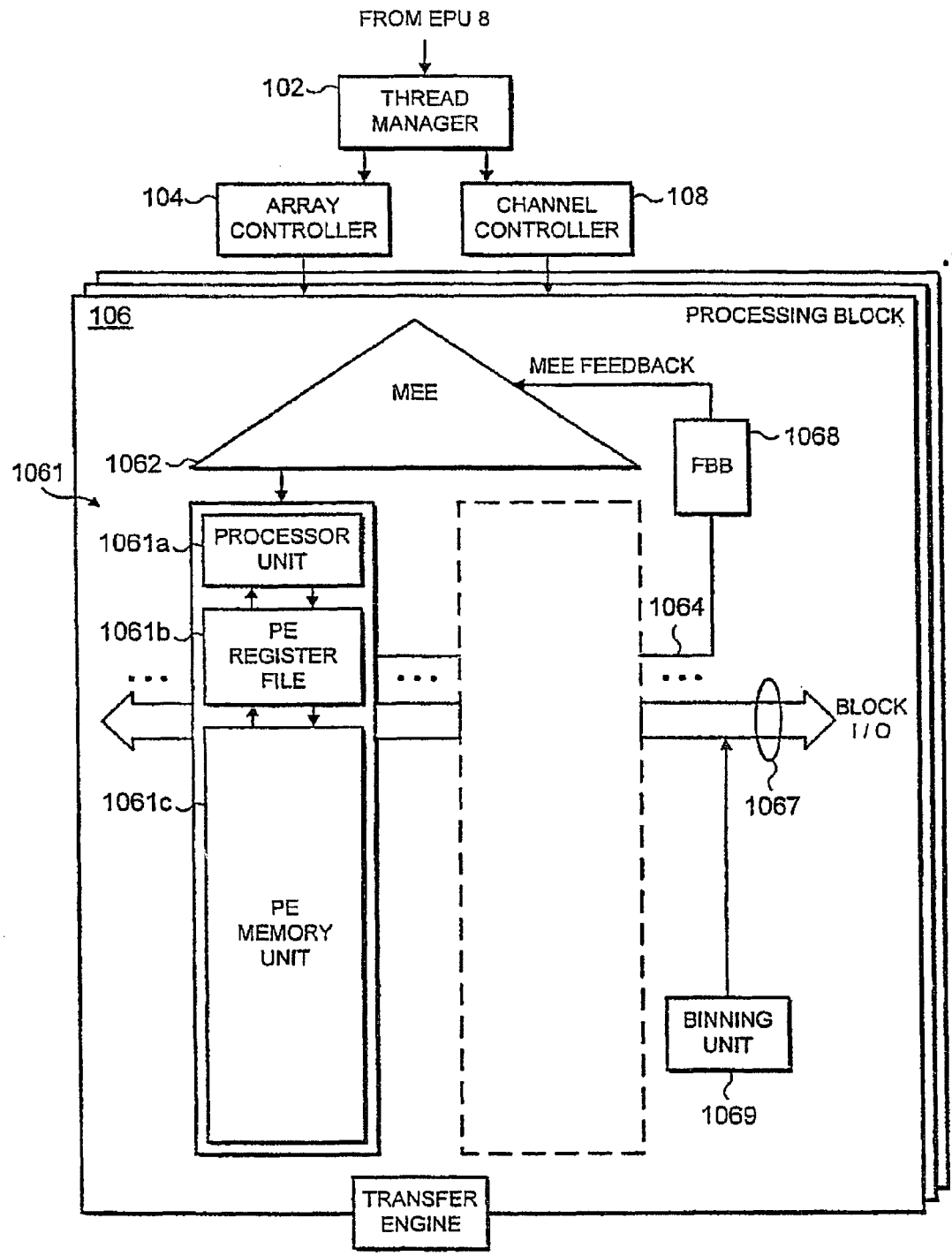
FIG. 3 is a block diagram of a processing core of the system of FIG. 2.

FIG. 3 shows the processing core in more detail. The thread manager 102 is connected to receive control signals from the EPU 8. The control signals inform the thread manager as to when instructions are to be fetched and where the instructions are to be found. The thread manager 102 is connected to provide these instructions to the array controller 104 and to the channel controller 108. The array and channel controllers 104 and 108 are connected to transfer control signals to the processing blocks 106 dependent upon the received instructions.

Each processing block 106 comprises an array 1061 of processor elements (PEs) and a mathematical expression evaluator (MEE) 1062. As will be described in more detail below, a path 1064 for MEE coefficient feedback is provided from the PE memory, as is an input/output channel 1067. Each processing block includes a binning unit 1069 unit 1068 and a transfer engine 1069 for controlling data transfers to and from the input/output channel under instruction from the channel controller 108.

The array 1061 of processor elements provides a single instruction multiple data (SIMD) processing structure.

Each PE in the array 1061 is supplied with the same instruction, which is used to process data specific to the PE concerned.

Each processing element (PE) 1061 includes a processor unit 1061a for carrying out the instructions received from the array controller, a PE memory unit 1061c for storing data for use by the processor unit 1061a, and a PE register file 1061b through which data is transferred between the processor unit 1061a and the PE memory unit 1061c. The PE register file 1061b is also used by the processor unit 1061a for temporarily storing data that is being processed by the processor unit 1061a.

The provision of a large number of processor elements can result in a large die size for the manufacture of the device in a silicon device. Accordingly, it is desirable to reduce the effect of a defective area on the device. Therefore, the system is preferably provided with redundant PEs, so that if one die area is faulty, another can be used in its place.

In particular, for a group of processing elements used for processing data, additional redundant processing elements can be manufactured. In one particular example, the processing elements are provided in "panels" of 32 PEs. For each panel a redundant PE is provided, so that a defect in one of the PEs of the panel can be overcome by using the redundant PE for processing of data. This will be described in more detail below.

Thread Manager

The array of processing elements is controlled to carry out a series of instructions in an instruction stream. Such instruction streams for the processing blocks 106 are known as "threads". Each thread works co-operatively with other threads to perform a task or tasks. The term "multithreading" refers to the use of several threads to perform a single task, whereas the term "multitasking" refers to the use of several threads to perform multiple tasks simultaneously. It is the thread manager 102 which manages these instruction streams or threads.

There are several reasons for providing multiple threads in such a data processing architecture. The processing element array can be kept active, by processing another thread when the current active thread is halted. The threads can be assigned to any task as required. For example, by assigning a plurality of threads for handling data I/O operations for transferring data to and from memory, these operations can be performed more efficiently, by overlapping I/O operations with processing operations. The latency of the memory I/O operations can effectively be masked from the system by the use of different threads.

In addition, the system can have a faster response time to external events, eg Assigning particular threads to wait on different external events, so that when an event happens, it can be handled immediately.

Figure 4:
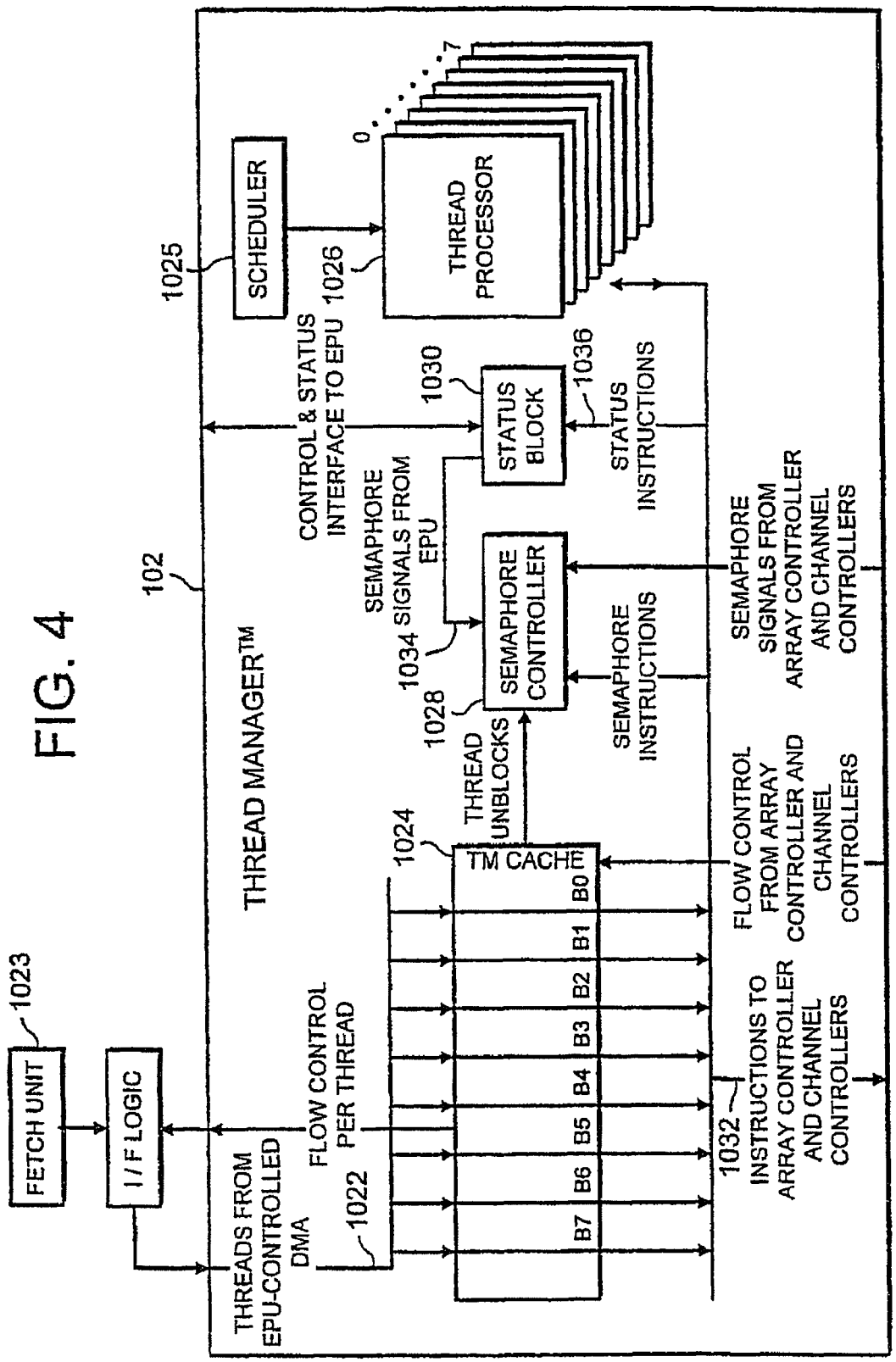
FIG. 4 is a block diagram of a thread manager of the system of FIG. 3.

The thread manager 102 is shown in more detail in FIG. 4, and comprises a cache memory unit 1024 for storing instructions fetched for each thread. The cache unit 1024 could be replaced by a series of first-in-first-out (FIFO) buffers, one per thread. The thread manager also includes an instruction fetch unit 1023, a thread scheduler 1025, thread processors 1026, a semaphore controller 1028 and a status block 1030.

Instructions for a thread are fetched from local memory or the EPU 8 by the fetch unit 1023, and supplied to the cache memory 1024 via connecting logic.

The threads are assigned priorities relative to one another. Of course, although the example described here has eight threads, any number of threads can be controlled in this manner. At any particular moment in time, each thread may be assigned to any one of a number of tasks. For example, thread zero may be assigned for general system control, thread 1 assigned to execute 2D (two dimensional) activities, and threads 2 to 7 assigned to executing 3D activities (such as calculating vertices, primitives or rastering).

In the example shown in FIG. 4, the thread manager includes one thread processor 1026 for each thread. The thread processors 1026 control the issuance of core instructions from the thread manager so as to maintain processing of simultaneously active program threads, so that each the processing blocks 106 can be active for as much time as possible. In this particular example the same instruction stream is supplied to all of the processing blocks in the system.

It will be appreciated that the number of threads could exceed the number of thread processors, so that each thread processor handles control of more than one thread. However, providing a thread processor for each thread reduces the need for context switching when changing the active thread, thereby reducing memory accesses and hence increasing the speed of operation.

The semaphore controller 1028 operates to synchronise the threads with one other.

Within the thread manager 102, the status block 1030 receives status information 1036 from each of the threads. The status information is transferred to the thread scheduler 1025 by the status block 1030. The status information is used by the thread scheduler 1025 to determine which thread should be active at any one time.

Core instructions 1032 issued by the thread manager 102 are sent to the array controller 104 and the channel controller 108 (FIG. 3).

Array Controller

Figure 5:
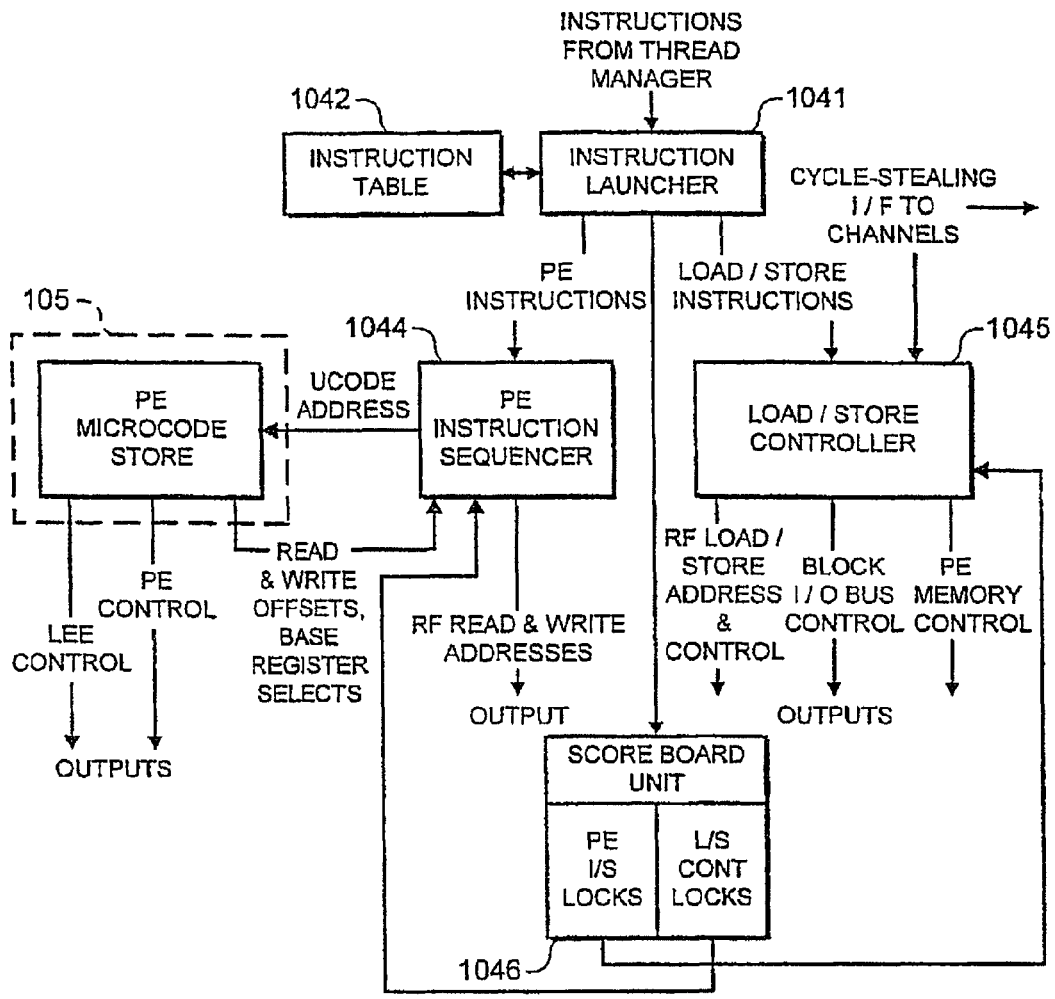
FIG. 5 is a block diagram of an array controller of the system of FIG. 3.

The array controller 104 directs the operation of the processing block 106, and is shown in greater detail in FIG. 5.

The array controller 104 comprises an instruction launcher 1041, connected to receive instructions from the thread manager. The instruction launcher 1041 indexes an instruction table 1042, which provides further specific instruction information to the instruction launcher.

On the basis of the further instruction information, the instruction launcher directs instruction information to either a PE instruction sequencer 1044 or a load/store controller 1045. The PE instruction sequencer receives instruction information relating to data processing, and the load/store controller receives information relating to data transfer operations.

The PE instruction sequencer 1044 uses received instruction information to index a PE microcode store 105, for transferring PE microcode instructions to the PEs in the processing array.

The array controller also includes a scoreboard unit 1046 which is used to store information regarding the use of PE registers by particular active instructions. The score board unit 1046 is functionally divided so as to provide information regarding the use of registers by instructions transmitted by the PE instruction sequencer 1044 and the load/store controller 1045 respectively.

In general terms, the PE instruction sequencer 1044 handles instructions that involve data processing in the processor unit 1061a. The load/store controller 1045, on the other hand, handles instructions that involve data transfer between the registers of the processor unit 1061a and the PE memory unit 1061c. The load/store controller 1045 will be described in greater detail later.

The instruction launcher 1041 and the score board unit 1046 maintain the appearance of serial instruction execution whilst achieving parallel operation between the PE instruction sequencer 1044 and the load/store controller 1045.

The remaining core instructions 1032 issued from the thread manager 102 are fed to the channel controller 108. This controls transfer of data between the PE memory units and external memory (either local memory or system memory in AGP or PCI space).

Channel Controller

The channel controller 108 operates asynchronously with respect to the execution of instructions by the array controller 104. This allows computation and external I/O to be performed simultaneously and overlapped as much as possible. Computation (PE) operations are synchronised with I/O operations by means of semaphores in the thread manager, as will be explained in more detail below.

The channel controller 108 also controls the binning units 1068 which are associated with respective processing blocks 106. This is accomplished by way of channel controller instructions.

Figure 6:
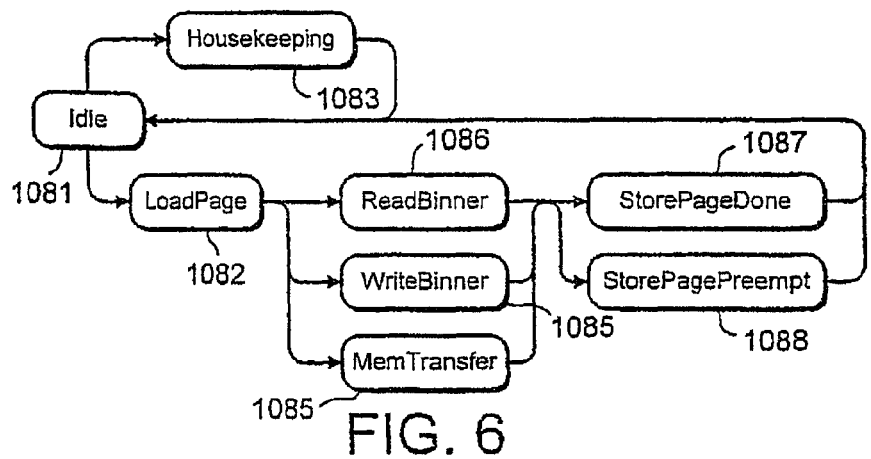
FIG. 6 is a block diagram of an instruction issue state machine of the channel controller of FIG. 3.

FIG. 6 shows the channel controller's instruction issue state machine, which lies at the heart of the channel controller's operation, and which will be described in greater detail later.

Each binning unit 1069 (FIG. 3) is connected to the I/O channels of its associated processing block 106. The purpose of the binning unit 1069 is to sort primitive data by region, since the data is generally not provided by the host system in the correct order for region based processing.

The binning units 1068 provide a hardware implemented region sorting system, (shown in FIG. 7), which removes the sorting process from the processing elements, thereby releasing the PEs for data processing.

Memory Access Consolidation

In a computer system having a large number of elements which require access to a single memory, or other addressed device, there can be a significant reduction in processing speed if accesses to the storage device are performed serially for each element.

The graphics system described above is one example of such a system. There are a large number of processor elements, each of which requires access to data in the local memory of the system. Since the number of elements requiring memory access exceeds the number of memory accesses that can be made at any one time, accesses to the local and system memory involves serial operation. Thus, performing memory access for each element individually would cause degradation in the speed of operation of the processing block.

In order to reduce the effect of this problem on the speed of processing of the system, the system of FIGS. 1 and 2 includes a memory access consolidating function.

The memory access consolidation is also described below with reference to FIGS. 12 and 13. In general, however, the processing elements that require access to memory indicate that this is the case by setting an indication flag or mark bit. The first such marked PE is then selected, and the memory address to which it requires access is transmitted to all of the processing elements of the processing block. The address is transmitted with a corresponding transaction ID. Those processing elements which require access (i.e. have the indication flag set) compare the transmitted address with the address to which they require access, and if the comparison indicates that the same address is to be accessed, those processing elements register the transaction ID for that memory access and clear the indication flag.

When the transaction ID is returned to the processing block, the processing elements compare the stored transaction ID with the incoming transaction ID, in order to recover the data.

Using transaction IDs in place of simply storing the accessed address information enables multiple memory accesses to be carried, and then returned in any order. Such a "fire and forget" method of recovering data can free up processor time, since the processors do not have to await return of data before continuing processing steps. In addition, the use of transaction ID reduces the amount of information that must be stored by the processing elements to identify the data recovery transaction. Address information is generally of larger size than transaction ID information.

Preferably, each memory address can store more data than the PEs require access to. Thus, a plurality of PEs can require access to the same memory address, even though they do not require access to the same data. This arrangement can further reduce the number of memory accesses required by the system, by providing a hierarchical consolidation technique. For example, each memory address may store four quad bytes of data, with each PE requiring one quad byte at any one access.

This technique can also allow memory write access consolidation for those PEs that require write access to different portions of the same memory address.

In this way the system can reduce the number of memory accesses required for a processing block, and hence increase the speed of operation of the processing block.

The indication flag can also be used in another technique for writing data to memory. In such a technique, the PEs having data to be written to memory signal this fact by setting the indication flag. Data is written to memory addresses for each of those PEs in order, starting at a base address, and stepped at a predetermined spacing in memory. For example, if the step size is set to one, then consecutive addresses are written with data from the flagged PEs.

Processing Blocks

Figure 8:
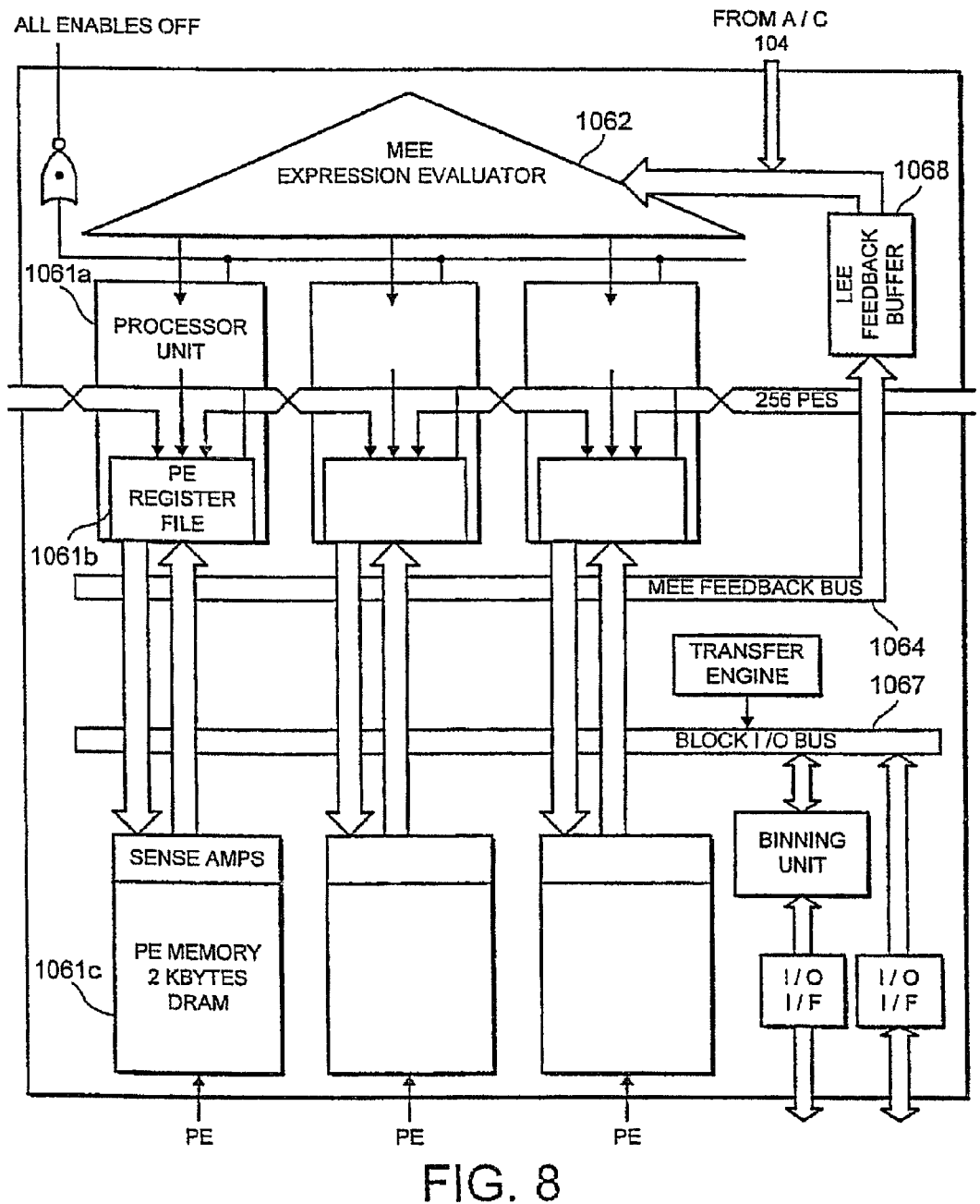
FIG. 8 is a block diagram of a processing block of the system of FIG. 3.

One of the processing blocks 106 is shown in more detail in FIG. 8. The processing block 106 includes an array of processor elements 1061 which are arranged to operate in parallel on respective data items but carrying out the same instruction (SIMD). Each processor element 1061 includes a processor unit 1061a, a PE register file 1061b and a PE memory unit 1061c. The PE memory unit 1063c is used to store data items for processing by the processor unit 1061a. Each processor unit 1061a can transfer data to and from its PE memory unit 1061c via the PE register file 1061b. The processor unit 1061a also uses the PE register file 1061b to store data which is being processed. Transfer of data items between the processor unit 1061a and the memory unit 1061c is controlled by the array controller 104.

Each of the processing elements is provided with a data input from the mathematical expression evaluator (MEE) 1062. The MEE operates to evaluate a mathematical expression for each of the PEs. The mathematical expression can be a linear, bi-linear, cubic, quadratic or more complex expression depending upon the particular data processing application concerned.

One particular example of a mathematical expression evaluator is the linear expression evaluator (LEE). The LEE is a known device for evaluating the bi-linear expression:

$$ax_i+by_j+c$$

for a range of values of $x_i$ and $y_j$.

The LEE is described in detail in U.S. Pat. No. 4,590,465. The LEE is supplied with the coefficient values a, b and c for evaluating the bi-linear expression, and produces a range of outputs corresponding to different values of $x_i$ and $y_j$. Each processing element 1061 represents a particular ($x_i$, $y_j$) pair and the LEE produces a specific value of the bi-linear expression for each processor element.

The bi-linear expression could, for example, define a line bounding one side of a triangle that is to be displayed. The linear expression evaluator then produces a value to indicate to the processor element whether the pixel for which the processor element is processing data lies on the line, to one side or the other of the line concerned. Further processing of the graphical data can then be pursued.

The mathematical expression evaluator 1062 is provided with coefficients from a feedback buffer (FBB) 1068 or from a source external to the processing block (known as immediates). The feedback buffer 1068 can be supplied with coefficients from a PE register file 1061b, or from a PE memory unit 1061c.

The bus structure 1064 is used to transfer data from the processor elements (register file or memory unit) to the FBB 1068. Each PE is controlled in order to determine if it should supply coefficient data to the MEE.

In one example, only one PE (at a time is enabled) to transfer data to the feedback buffer FBB 1068. The FBB queues the data to be fed to the MEE 1062. In another example, multiple PEs can transfer data to the FBB at the same time, and so the handling of the transfer of data would then depend upon the nature of the MEE feedback bus structure 1064. For example, the bus could be a wired-OR so that if multiple data is written, the logical OR of the data is supplied to the MEE 1062.

The MEE operand feedback path can also effectively be used to communicate data from one processor element to all the others in the block concerned, by setting the a and b coefficients to zero, and supplying the data to be communicated as the c coefficient. All of the MEE results would then be equal to the coefficient c, thus transferring the data to the other processor elements.

In the present system the processing blocks 106 are provided with opcodes (instructions) and operands (data items) for the expression evaluator separately from one another. Previously, instructions and data are provided in a single instruction stream. This stream must be produced during processing which can result in a slowing of processing speed, particularly when the operands are produced in the array itself.

In the present system, however, since the opcode is separated from the operand, opcodes and operands can be produced by different sources and are only combined when an operation is to be performed by the MEE 1062.

Graphics Data Processing

Figure 9:
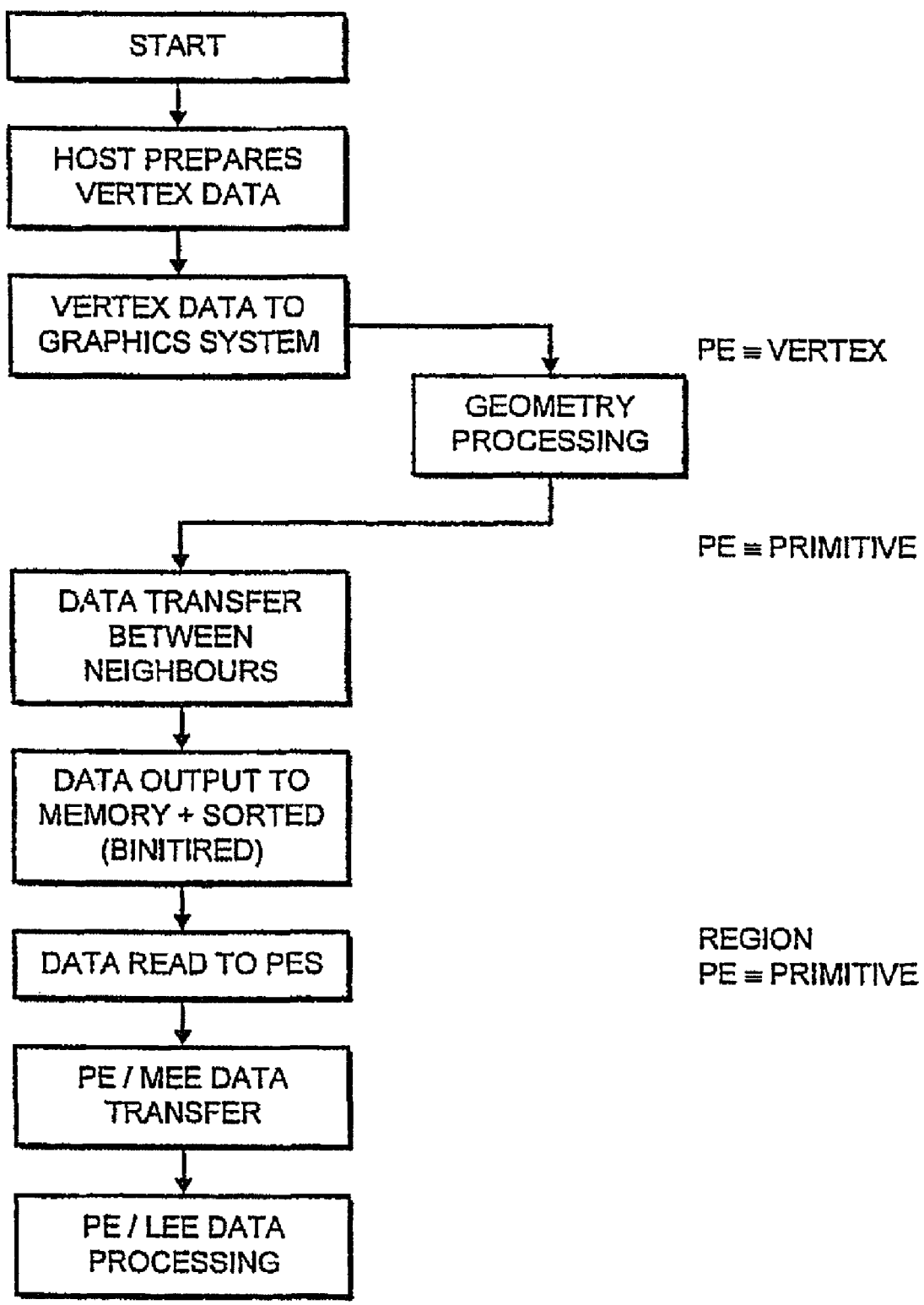
FIG. 9 is a flowchart illustrating data processing using the system of FIGS. 1 to 8.

FIG. 9 illustrates simplified steps in a graphics data processing method using the system of FIGS. 1 to 8. The host system prepares data concerning the vertices of the primitive graphical images to be processed and displayed by the graphics system. The data is then transferred, either as a block of vertex data, or vertex by vertex as it is prepared by the host system to the graphics system.

The data is loaded into the PEs of the graphics system so that each PE contains data for one vertex. Each PE then represents a vertex of a primitive that can be at an end of a line or part of a two dimensional shape such as a triangle.

The received data is then processed to transform it from the host system reference space to the required screen space. For example, three dimensional geometry, view, lighting and shading etc. is performed to produce data depending upon the chosen viewpoint.

Each PE then copies its vertex data to its neighbouring PEs so that each PE then has at least one set of vertex data that corresponds to a graphical primitive, be that a line, a triangle or a more complex polygon. The data is then organised on a primitive per PE basis.

The primitive data is then output from the PEs to the local memory in order that it can be sorted by region. This is performed by the binning unit 1069 of FIG. 3, as will be described in more detail below. The binning unit 1069 sorts primitive data by region, since the data is generally not provided by the host system in the correct order for region based processing.

The binning units 1068 provide a hardware implemented region sorting system which removes the sorting process from the processing elements, thereby releasing the PEs for data processing.

All of the primitive data is written into local memory, each primitive having one entry. When data for a particular primitive is written, its extent is compared with the region definitions. Information regarding the primitives that occur in each region is stored in local memory. For each region in which at least part of a primitive occurs, a reference is stored to the part of local memory in which the primitive data is stored. In this way, each set of primitive data need only be stored once.

Once the primitive information has been stored in local memory, it is read back into the individual PEs. However, at this stage, all of the PEs in one processing block contain data concerning respective primitives occurring in a single region. From this point, a given processing block operates on data associated with a single region of the display.

Each PE then transfers, in turn, its data concerning its primitive to the MEE for processing into pixel data. For example, a PE will supply coefficient data to the MEE which define a line that makes up one side of a triangular primitive. The MEE will then evaluate all of the pixel values on the basis of the coefficients, and produce results for each pixel which indicate whether a pixel appears above, below or on the line. For a triangle, this is carried out three times, so that it can be determined whether or not a pixel occurs within the triangle, or outside of it. Each PE then also includes data about a respective pixel (i.e., data is stored on a pixel per PE basis).

Once each pixel is determined to be outside or inside the triangle (primitive) concerned, the processing for the primitive can be carried out only on those pixels occurring inside the primitive. The remainder of the PEs in the processing block do not take any further part in the processing until that primitive is processed.

Detailed Description of the Functional Units Described Above

Thread Manager

A detailed description will now be given of the thread manager 102, which as mentioned above with reference to FIG. 4, comprises a cache memory unit 1024 for storing instructions fetched for each thread. The cache unit 1024 could be replaced by a series of first-in-first-out (FIFO) buffers, one per thread. The thread manager also includes an instruction fetch unit 1023, a thread scheduler 1025, thread processors 1026, a semaphore controller 1028 and a status block 1030.

Instructions for a thread are fetched from local external memory 103 or from the EPU 8 by the fetch unit 1023, and supplied to the cache memory 1024 via connecting logic.

At a given time, only one thread is executing, and the scheduling of the time multiplexing between threads is determined by the dynamic conditions of the program execution. This scheduling is performed by a thread scheduler in the thread manager 102, which ensures that each processor block 106 is kept busy as much as possible. The switching from one thread to another involves a state saving and restoring overhead. Therefore, the priority of threads is used to reduce the number of thread switches, thereby reducing the associated overheads.

Core instructions issued by the thread manager 102 are sent to one of two controller units, the array controller 104 or channel controller 108.

Determining which Thread should be Active

The thread scheduler, when running, recalculates which thread should be active whenever one of the following scheduling triggers occur:

A thread with higher priority than the current active thread is READY, or

The thread is (not Ready) and YIELDING.

The thread scheduler is able to determine this because each thread reports the status of whether it is READY or YIELDING back to the thread scheduler, and are examined in a register known as the Scheduler-Status register.

In determining the above, a thread is always deemed to be READY, unless it is:

waiting on an instruction cache miss, waiting on a zero semaphore;

waiting on a busy execution unit, or waiting on a HALT instruction.

When a thread stops operation, for example because it requires memory access, it can be "yielding" or "not yielding". If the thread is yielding, then if another thread is ready, then that other thread can become active. If the thread is not yielding, then other threads are prevented from becoming active, even though ready. A thread may not yield, for example, if that thread merely requires a short pause in operation. This technique avoids the need to swap between active threads unnecessarily, particularly when a high priority thread simply pauses momentarily.

In the event that a scheduling trigger occurs as described above, the scheduler comes into effect, and carries out the following. First, it stops the active thread from running, and waits a cycle for any semaphore decrements to propagate.

If the previously active thread is yielding, the scheduler activates the highest priority READY thread, or the lowest priority thread if no thread is ready (since this will cause another immediate scheduling trigger).

If the previously active thread is not yielding, the scheduler activates the highest priority thread which is READY which has higher priority than the previously active thread. If there is no such thread, the scheduler reactivates the previously active thread (which will cause another scheduling trigger if that thread has not become READY).

The thread scheduler can be disabled through the EPU interface. When the scheduler is disabled the EPU is able to control activation of the threads. For example, the EPU could start and stop the active thread, set the active thread pointer to a particular thread, and single step through the active thread.

Figure 10A:
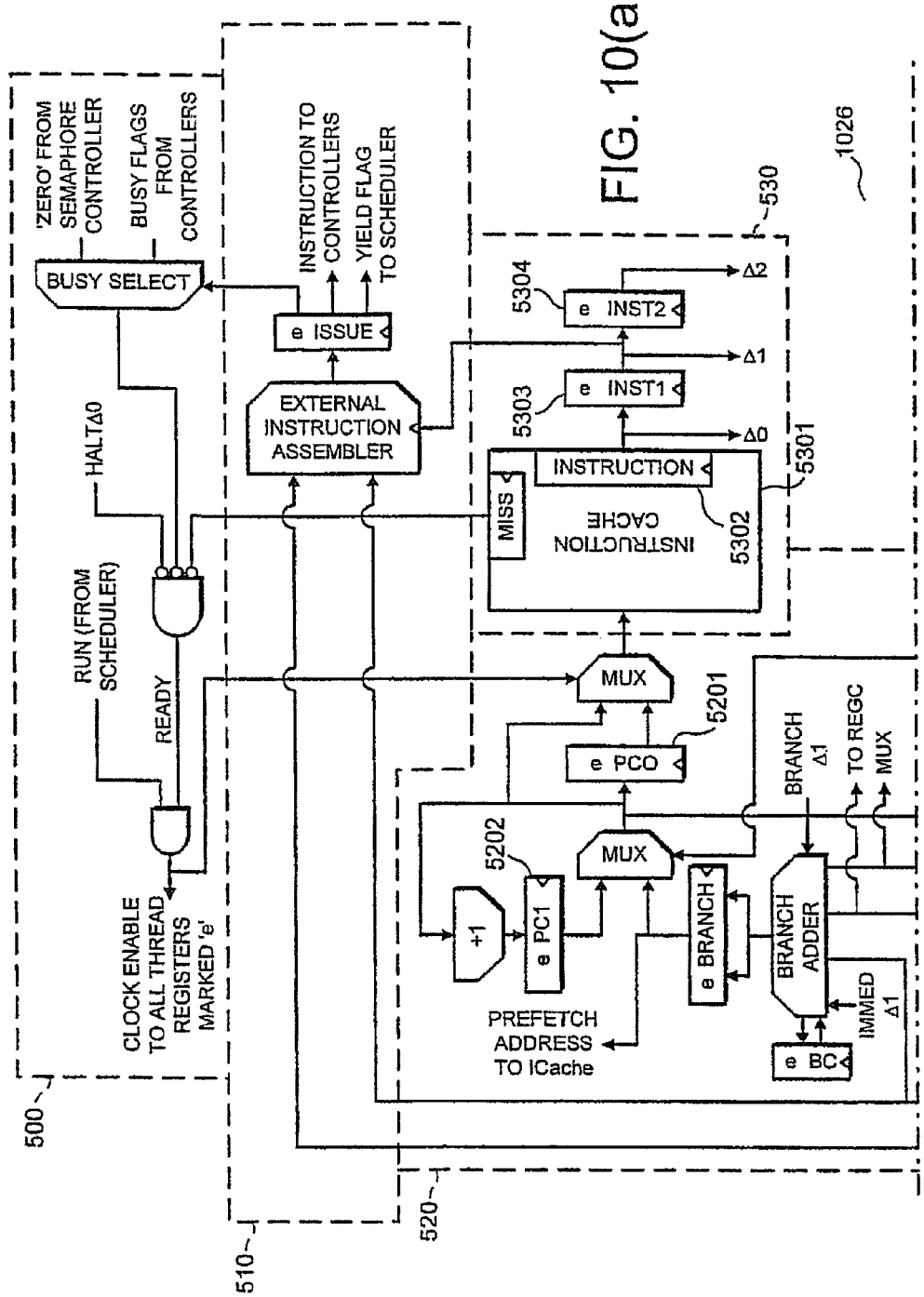
FIG. 10 is a more detailed block diagram of a thread processor of the thread manager of FIG. 4.
Figure 10B:
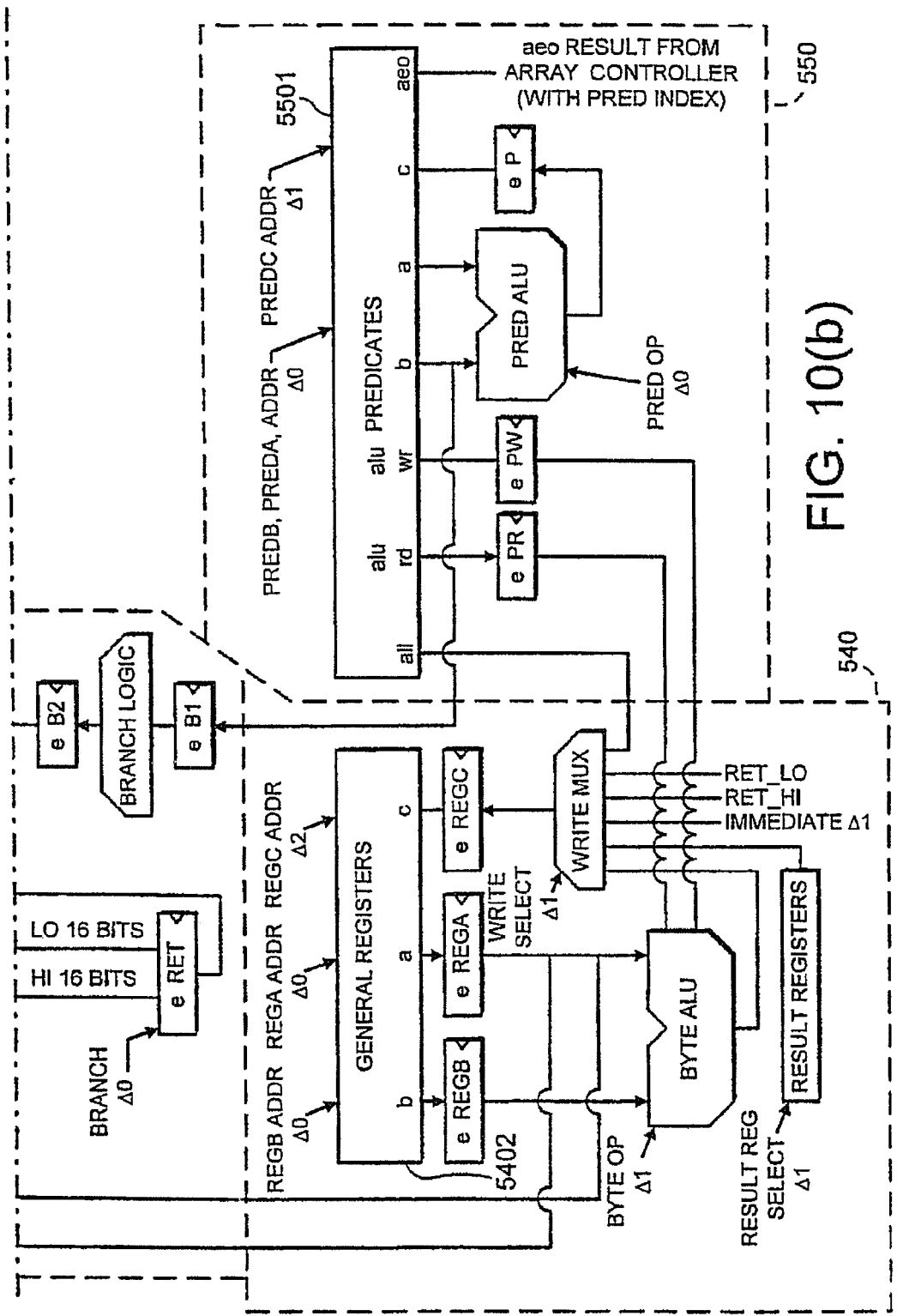

The thread manager 102 only decodes thread manager instructions or semaphore instructions. In addition, each thread has its own thread processor 1026, as shown in FIG. 10. The thread processor 1026 can be divided into several parts in order to aid understanding of its operation.

Each thread processor comprises a byte alu 540, a predicate alu 550, a branch unit 520, an instruction cache 530, an instruction assembler 510 and an enable unit 500.

The purpose of the thread processor 1026 is to allow high level flow control to be performed for a thread, (such as looping and conditional branches), and to assemble instructions to be issued to the array controller 104 and channel controller 108.

An enable unit 500 is used to determine whether a thread is READY, as outlined in the text above.

The instruction cache 530 receives addresses for instructions from the branch unit 520 and fetches them from the cache 5301. During start up, the EPU can program the program counters in the branch unit. If the cache 5301 does not contain the instruction, a cache miss is signalled, and an instruction fetch from local memory is initiated. If there is no miss, the instruction is latched into the instruction register 5302.

The branch adder 520 controls the address of the next instruction. In the normal course of events, it simply increments the last address, thus stepping sequentially through the instructions in memory. However, if a branch is requested, it calculates the new address by adding an offset (positive or negative) to the current address, or by replacing the current address with an absolute address in memory. If the thread processor is halted, a PC0 register 5201 provides the last address requested, as a PC1 register 5202 will already have been changed.

The byte alu section 540 provides a mechanism for performing mathematical operations on the 16-bit registers contained in the thread processor 102. The programmer can use thread manager instructions to add, subtract and perform logical operations on the thread processor general registers 5402, thereby enabling loops to be written. Information can also be passed to the array controller 104 from the general registers by using the byte alu 540 and the instruction assembler 510.

The predicate alu 550 contains sixteen 1 bit predicate registers 5501. These represent true or false conditions. Some of these predicates indicate carry, overflow, negative, most significant bit status for the last byte alu operation. The remaining predicates can be used by the programmer to contain conditions. These are used to condition branches (for loop termination), and can receive status information from the array controller 104 indicating "all enable registers off" (AEO) in the array.

The instruction assembler 510 assembles instructions for the various controllers such as channel controller 108 and array controller 104. Most instructions are not modified and are simply passed on to the respective controllers. However, sometimes fields in the various instructions can be replaced with the contents of the general registers. The instruction assembler 510 does this before passing the instruction to the relevant controller. The instruction assembler 510 also calculates the yield status, the wait status and the controller signal status sent to the enable unit 500 and the scheduler in the thread manager 102.

Semaphore Controller

Synchronisation of threads and control of access to other resources is provided by the semaphore controller 1028.

Semaphores are used to achieve synchronisation between threads, by controlling access to common resources. If a resource is in use by a thread, then the corresponding semaphore indicates this to the other threads, so that the resource is unavailable to the other threads. The semaphore can be used for queuing access to the resource concerned.

In a particular example, the semaphore controller 1028 uses a total of eighty semaphores, split into four groups in dependence upon which resources the semaphores relate to.

Semaphore Count and Overflow

The semaphores have an eight bit unsigned count. However, the msb (bit7) is used as an overflow bit, and thus should never be set. Whenever any semaphore's bit 7 is set, the semaphore overflow flag in the thread manager status register is set. If the corresponding interrupt enable is set the EPU is interrupted. The semaphore overflow flag remains set until cleared by the EPU.

Semaphore Operations

The following operations are provided for each semaphore:

Preset: A thread can preset the semaphore value. The thread should issue a preset instruction only when it is known that there are no pending signals for the semaphore.

Wait: A thread can perform a wait operation on the semaphore by issuing a wait instruction. If the semaphore is nonzero the semaphore is decremented. If it is zero the thread is paused waiting to issue the wait instruction.

Signal: The semaphore is incremented. This operation can be performed by the threads, the PE Sequencer, the Load/Store Unit, or the Channel Controller. But in general a semaphore can only be signalled by one of these, as discussed below.

The EPU 8 can read and write the thread semaphore counts anytime. In general, the core should not be executing instructions when the EPU accesses the other semaphore values.

Semaphore Groups

The semaphores are broken into four groups according to which execution units they can be signalled by.

| group id | number of semaphores in group | semaphore group name | semaphores in group can be signalled by |
|---|---|---|---|
| 0 | 32 | Thread | threads and EPU |
| 1 | 16 | Channel | channel controller |
| 2 | 16 | Load/Store | load/store unit |
| 3 | 16 | PE | PE sequencer |

The EPU can read and write all semaphore values when the core is frozen. In addition, the EPU can preset, increment, and decrement a thread semaphore at any time as follows:

Increment: the EPU can atomically increment the semaphore by writing its increment register (an atomic operation is an operation that cannot be interrupted by other operations, as is well known).

Decrement: the EPU can atomically decrement the semaphore by reading its decrement register. If the semaphore is nonzero before decrementing the read returns TRUE. Otherwise the read returns FALSE and the semaphore is left at zero.

Each thread semaphore has a separately enabled nonzero interrupt. When this interrupt is enabled the semaphore interrupts the EPU when nonzero. The EPU would typically enable this interrupt after receiving a FALSE from a semaphore decrement. Upon receiving the interrupt, it is preferable to attempt the decrement again.

Array Controller

A detailed description will now be given of the array controller 104, as shown in FIG. 5. The array controller 104 directs the operation of the processing block 106. The array controller 104 comprises an instruction launcher 1041, connected to receive instructions from the thread manager. The instruction launcher 1041 indexes an instruction table 1042, which provides further specific instruction information to the instruction launcher.

On the basis of the further instruction information, the instruction launcher directs instruction information to either a PE instruction sequencer 1044 or a load/store controller 1045. The PE instruction sequencer receives instruction information relating to data processing, and the load/store controller receives information relating to data transfer operations.

The PE instruction sequencer 1044 uses received instruction information to index a PE microcode store 105, for transferring PE microcode instructions to the PEs in the processing array.

The array controller also includes a scoreboard unit 1046 which is used to store information regarding the use of PE registers by particular active instructions. The scoreboard unit 1046 is functionally divided so as to provide information regarding the use of registers by instructions transmitted by the PE instruction sequencer 1044 and the load/store controller 1045 respectively.

The instruction launcher 1041 and the scoreboard unit 1046 maintain the appearance of serial instruction execution whilst achieving parallel operation between the PE instruction sequencer 1044 and the load/store controller 1045.

The remaining core instructions 1032 issued from the thread manager 102 are fed to the channel controller 108. This controls transfer of data between the PE memory units and external memory (either local memory or system memory in AGP or PCI space).

In order to maintain the appearance of serial instruction execution, the PE instruction sequencer or Load/store controller stalls the execution of an instruction when that instruction accesses a PE register which is locked by a previously launched, still executing instruction from the load/store controller and PE instruction sequencer respectively. This mechanism does not delay the launching of instructions. Instruction execution is stalled only when a lock is encountered in the instruction execution.

The PE register accesses which cause a stall are:

Any access to a locked register

Write to the enable stack (used as enable for load/store)

Write to a P register (FIG. 4) (used as indexed address for load/store)

Write to a V register (FIG. 4) (used as enable for MEE feedback)

The Instruction Launcher 1041 determines which registers an instruction accesses and locks these registers as the instruction is launched. The registers are unlocked when the instruction completes. For load/store instructions, determining the accessed registers is straightforward. This is because the accessed registers are encoded directly in the instruction. For PE instructions the task is more complex because the set of accessed registers depends on the microcode. This problem is solved by using nine bits of the PE instruction to address the instruction table 1042 (which is preferably a small memory), which gives the byte lengths of the four operands accessed by the instruction.

The instruction table 1042 also determines whether the instruction modifies the enable stack, P register, or V register. Furthermore, it also contains the microcode start address for the instruction.

When a PE instruction is launched, the instruction table 1042 is accessed to determine the set of registers accessed. These registers are marked in the scoreboard 1046 as locked by that instruction. The registers are unlocked when the instruction completes. Load/Store instructions are stalled when they access or use a register locked by the PE instruction sequencer 1044.

When a load/store instruction is launched, all register file registers (R31-R0) which are loaded or stored by that instruction are locked. The registers are unlocked when the instruction completes. PE instructions are stalled when they access a register locked by the load/store controller.

Writes to the P registers stall execution of the Load/Store unit as follows (V register and enable stack are similar). When a PE instruction is launched, it locks the P register if the instruction table lookup indicates that the instruction modifies the P register. The P register remains locked until the instruction completes. A load/store instruction stalls while the P register is locked if the load/store instruction's Indirect bit is set. A load/store instruction stalls while the V register is locked if the load/store instruction writes the feedback buffer. A load/store instruction stalls while the enable stack is locked if the load/store instruction=s Condition bit is set.

As mentioned earlier, the instruction table 1042 may be a small memory (RAM), 512 words deep by 64 bits wide. The table is addressed by the instruction index field of PE instructions to determine the instruction start address and type. The table is written with the Load Address and Load Data housekeeping instructions and is read via I address and I data registers on the EPU bus.

Load/Store Controller

A detailed description will now be given of the load/store controller 1045.

In a particular example, PE memory cycles are nominally at one quarter of the PE clock rate, but can be geared to any desired rate, such as one sixth of the PE clock rate. The memory is 128 bits wide (a page), and has a quadbyte (32-bit) wide interface to the PE register file. This register file interface runs at four times the memory cycle rate, so the register file interface runs at full memory speed.

Load/store controller instructions execute in one memory cycle (nominally four PE cycles) unless they are stalled by the instruction launcher 1041 or by cycles stolen for refresh or I/O.

Each load/store instruction transfers part or all of a single memory page. No single load/store instruction accesses more than one page.

Memory Operations Performed by the Load/Store Controller

The load/store controller 1045 performs the following operations on PE memory 1063:

loads and stores from PE memory 1063 to PE register files reads from PE memory 1063 to the MEE feedback buffers copies from PE memory to PE memory PE memory refresh I/O channel transfers

Loading and Storing from PE Memory to PE Register Files

The Load and Store instructions transfer the number of bytes indicated between a single memory page and four quadbytes of the register file as follows:

The memory access begins at the indicated memory byte address (after applying address manipulations, see below) and proceeds for the indicated number of bytes, wrapping from the end of the page (byte 15) to the start of the page (byte 0).

The register file access is constrained to four quadbytes of the register file. The access begins at the indicated register and proceeds through four quadbytes, then wraps to byte 0 of the first quadbyte accessed.

Once the transfer is initiated it executes in one memory cycle.

Reading from PE Memory to the Lee Feedback Buffers

All or part of a memory page may be copied to the MEE feedback buffer. The page address can be modified with the Memory Base Register mechanism (see below). Each quadbyte of the page can be copied into any subset of the A, B, or C parts of the MEE feedback buffer, with a feedback buffer push available after each quadbyte.

Cycle Priorities

Memory refresh has priority over all other memory operations. The Load/Store versus I/O Channels priority is selected by a status register bit.

Refresh

The PE Memory is dynamic and must be refreshed. This may be achieved in software by ensuring all pages are read every refresh period. However, the preferred method is to include a hardware refresh in the architecture.

Address Manipulations

The memory addresses used by the load/store controller 1045 can be manipulated with either or both of the following two mechanisms:

Memory Base Register (MBR)

The Memory Base Register is optionally added to the page address specified by appropriate instructions, conditioned by a bit in the instruction.

Each thread has its own MBR in the array controller. Threads load their MBR with a housekeeping instruction. The MBR can be read over the EPU bus.

Address Indexing

When an instruction=s Index bit is set, the low five bits of the instruction=s memory quadbyte address are ORed per PE with the low five bits of the PE's P register.

Channel Controller

A detailed description now follows of the channel controller 108. As mentioned above, the channel controller controls the transfer of data between external memory and PE memory. At each processing block 106, a transfer engine carries out Direct Memory Access DMA transfers between the block I/O registers and the bus architecture. Depending upon the channel instruction, the data transfers go through a binning unit 1069, or directly to/from external memory.

The channel controller 108 operates on an instruction set which is spilt into three fundamental parts:

Read instructions which transfer data from external memory to PE memory,

Write instructions which transfer data from PE memory to external memory,

Housekeeping instructions which manipulate register values within the channels and binning units.

Instructions from the thread manager 102 are pushed into three separate instruction FIFOs for low priority, high priority, and binner instructions. Each FIFO has its own "full" indication which is sent to the thread manager 102, so that a thread blocked on a full instruction FIFO will not prevent another thread from pushing an instruction into a non-full instruction FIFO.

FIG. 6 shows an instruction state machine which controls the operation of the channel controller 108.

All instructions are launched from the idle state 1081. The highest priority ready instruction is launched, where the instruction readiness is determined according to preset rules.

There are three priorities for channel instructions: Addressed and Strided instructions can be specified as low or high priority. Binning instructions are always treated as very high priority. Lower priority instructions may be interrupted or pre-empted by higher priority ones. When a transfer instruction is pre-empted, the contents of the PE page registers are returned to the PE memory pages from which they came. They can then be restarted at a later time when the higher priority instruction has completed.

Addressed instruction are data transfers between PE memory and external memory where every PE specifies the external memory address of the data it wishes to read or write.

The data transfer is subject to the consolidation process, so that, for example, four PEs that each write to different bytes of a 32 byte packet address result in a single memory access of 32 bytes, any subset of which may contain valid data to be written to external memory. Also, any number of PEs which wish to read data from the same packet address have their accesses consolidated into a single access to external memory.

In a Write Addressed instruction, each PE supplies 8 bytes of data together with the external memory address it is to be written to, and 8 bits which serve as byte enables. Any number of PEs which wish to write data to the same packet address have their accesses consolidated into a single access to external memory.

In a Read Addressed instruction, each PE supplies an address for the data it wishes to read, and sixteen bytes of data (one half of a memory packet) are delivered back to the PE.

"Strided" memory accesses are data transfers between PE memory and external memory where the external memory address of each PEs data is generated by the transfer engine. Addresses are stepped from a base register by a predetermined step size, such that the selected PEs send to or receive from spaced external memory addresses. For example, if the step size is set to one, then the selected PEs access consecutive memory addresses. This has the advantage over "Addressed" transfers in that PEs can use all their I/O page register data, instead of using some of it for address information. The base address for the transfer can be specified with a channel controller instruction or written by the EPU.

For a Write Strided instruction, each PE outputs 16 bytes of data. Data from two PEs is combined into a 32 byte data packet and written to an external memory address generated by the transfer engine. Consequently packets are written to incrementing addresses. Optionally in the instruction, the external address that each PE's data was written to can be returned to the PE I/O page registers.

For potential Read Strided instructions, each PE in turn receives 16 bytes of data from stepped addresses under control of the transfer engine.

Binning instructions relate to data transfers between PE memory and external memory where the data flows through the binning unit of each core block between the block I/O bus and a system bus to external memory. The binning unit contains a number of control registers that are set with special instructions. It generates external memory addresses for all the data being written to or read from external memory. It contains logic for the support of binning primitives into the regions that they fall in, and for merging multiple bin lists that are held in external memory. It also performs management of bin lists in external memory. Data flow between PEs and the binning unit are buffered in a FIFO.

Binning Function

As mentioned above, each processing block 106 has an associated binning unit 1069, which is attached between the block I/O bus and the system bus 6. The binning unit provides specific support for the writing and reading of primitive pointers in bin lists in external memory.

The binning process must maintain primitive order between the geometry and rasterisation phases due to requirements of most host systems. Since both phases are block parallel, there needs to be a mechanism for transferring data between any block to any of the bins and between any bin and any block. This is implemented by creating multiple bin lists per region, one for every processing block 106 that is processing geometry data. This allows the geometry output phase to proceed in block parallel mode. Then, during the rastering phase, each region is processed by just one processing block 106, and a merge sort of the multiple bin lists in memory for that region is performed.

The binning unit 1069 only handles pointers. Primitive data itself can be written to memory using normal channel write operations. It can also be read using normal channel read operations once the binner hardware has provided each PE with a primitive pointer.

A record is kept of how many primitives are written to each bin, so that regions can be sorted into similar size groups for block parallel rasterisation. In addition, primitive "attribute" flags are recorded per region. This allows optimisation of craterisation and shade code per region by examining the bitwise "OR" of a number of defined flags of every primitive in a region. In this way regions requiring similar processing can be grouped for parallel processing, which results in reduced processing time.

After the PE array 1061 has computed bounding boxes for primitives, the binner hardware offloads the binnitization process from the PE array 1061, and turns it into a pure I/O operation. This enables it to be overlapped with some further data processing, for example the next batch of processing geometry data.

Writing—On writing the primitive pointers at the end of a geometry pass, the PEs output the pointers, flags and bounding box information for primitives on the channel. The binning unit 1069 appends the pointer to the bin list of every region included in the bounding box for that primitive. It also updates the primitive count and attribute flags for that region. The binner is responsible for maintaining the bin lists only for its processing block 106, and the bin list state is preserved across multiple geometry passes.

Reading—The binning unit 1069 supplies ordered primitive pointers to the processing block 106, one per PE that requests, for a specific region. It traverses the multiple bin lists for that region, with a merge sort to restore original primitive order. Bin list state is preserved across multiple rasterisation passes.

Binning Memory Organisation

The bin lists are created in external memory, by outputting list data to memory. The bin lists indicate the locations of the contents of the bin within memory. Maintenance of such linked list structures requires additional storage in the form of pointer arrays. The binner hardware accesses these structures in memory directly.

Binning Hardware

Figure 7:
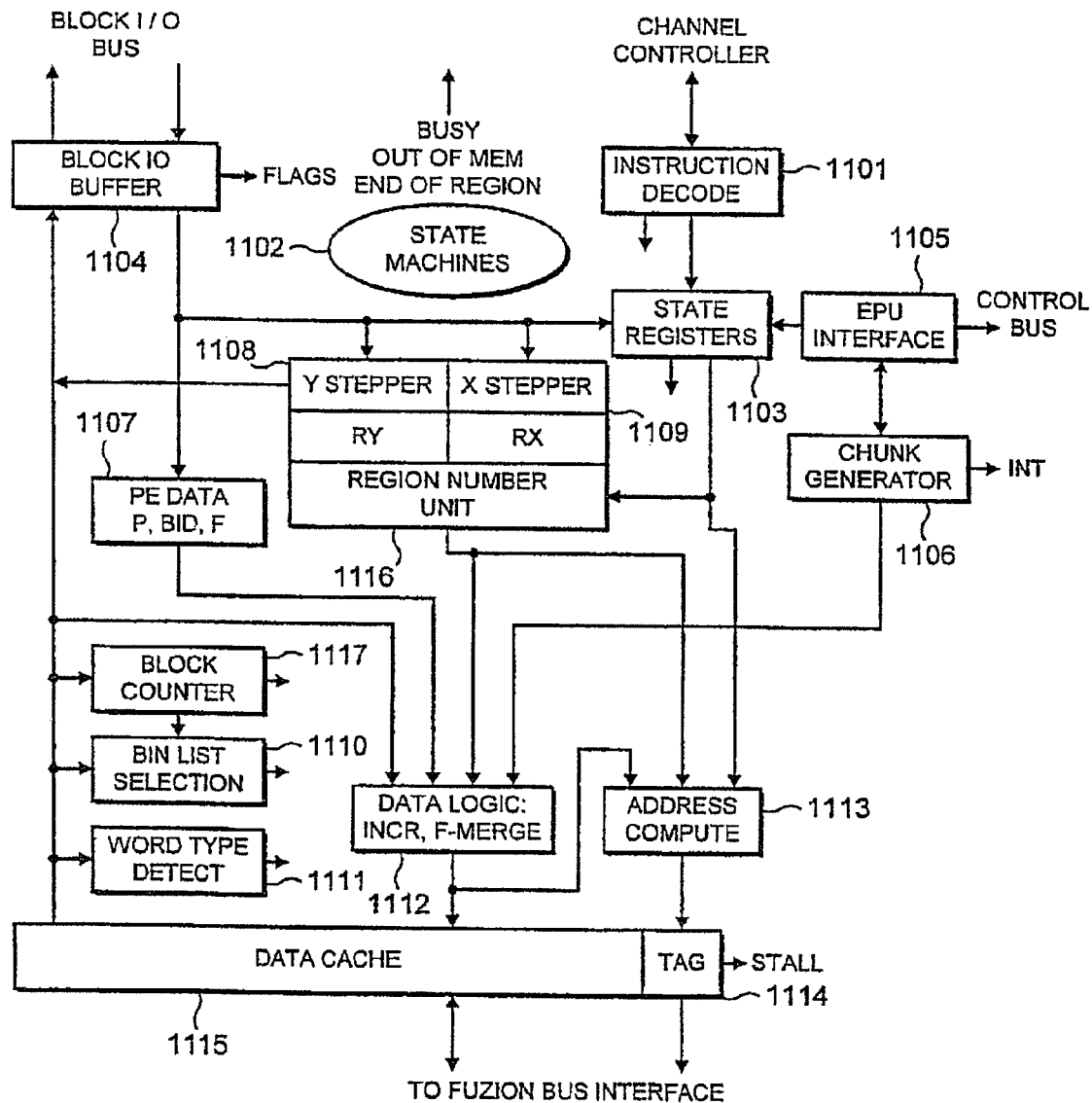
FIG. 7 is a block diagram of a binning unit of the system of FIG. 3.

The binning hardware is shown in detail in FIG. 7, and is responsible for handling the computation involved in the binnitization process needed to enable the PE array 1061 to read and write primitive pointers to external memory.

Instruction decoder 1101 receives instructions from the channel controller 108, and triggers the state machine 1102 into operation. The state machine 1102 is the logic that sequences the other parts of the binning unit to perform a particular function such as reading or writing primitive pointers to or from external memory. The state machine 1102 may be implemented as several communicating state machines. Control signals to all other parts of the binning unit are not shown.

The binnitization function is executed by the binning unit according to a set of internal registers 1103 that define the current binning context, that is the location of bin lists in external memory, the region to be rasterised next, the operation mode and so on. This set of "state" registers 1103 is multiple ported to the channel controller 108, the block I/O bus and the EPU 8 (i.e. the registers have a number of ports that can be used simultaneously).

Between the block I/O bus and the binning unit 1069 itself there is a data buffer FIFO 1104, which is regarded as being part of the binning unit 1069. The purpose of the data buffer 1104 is to buffer data flowing between the PE I/O page registers and the binning unit 1069, to smooth out the indeterminate timing of the binning unit 1069. Data is transferred to/from the binning unit 1069 in bursts of size that depends on the buffer depth. The binning unit 1069 presents the status of this buffer to the rest of the block control logic, and by looking at the status of all the binning unit buffers 1104, the channel controller 108 can schedule data transfer bursts to the binning units 1068 in an efficient way.

The binning unit 1069 of each block has its own register set interface 1105 to the EPU 8. The EPU 8 performs the following set of binning unit 1069 tasks via the interface 1105:

Initialisation

Allocation of bin list memory

Save and restore of binning state on context switch

When the binning unit 1069 is executing a Write Binner instruction, it needs an unknown amount of memory to be allocated for the creation of bin lists. It requests this memory a portion at a time from the EPU 8, and assigns it to whichever bin lists require it. The binner unit 1068 assigns small chunks (portions) of 32 bytes to bin lists, but this would load the EPU intolerably if it were to be allocated at this level. Instead, the EPU provides a large portion of data of whatever size it decides is appropriate (for example, 64 kBytes, but any convenient multiple of 32 bytes) and the binner unit 1068 divides this up into individual chunks, using the chunk generator 1106. The transfer of large amounts of data from the EPU is more efficient for the EPU, and the processing of small amounts of data for the binning unit 1069 is more efficient for the binning unit 1069.

During pointer writing, primitive data from PEs is lodged in a register set 1107, and passed to the data logic 1112 as required.

A Y stepper 1108 is used to step the y-axis region coordinate across the primitive bounding box during pointer writing as part of the binnitization process. It comprises a counter and register pair with an equality comparator.

An X stepper 1109 is used to step the X-axis region coordinate across the primitive bounding box during pointer writing as part of the binnitization process. It also comprises a counter and register pair with an equality comparator. However, since the X stepper must also run the same sequence of values for every value of the Y stepper 1108, the counter is loaded and reloaded from an extra register that contains the initial value.

To merge block bin lists for a region during the pointer read process, there is provided a dedicated hardware section 1110. So that primitives can be ordered through the binning process, a batch id code is added to the bin lists. The batch id code relates to the geometry ordering, since host requires geometry to be returned in the correct order. Under control of the state machine 1102, and aided by a block counter 1117, the binning unit 1069 evaluates which bin list has the lowest batch ID and directs pointer reading from that list.

When a further batch ID is encountered in that list, or a NULL terminator encountered, the block selection is re-evaluated. The block counter 1117 provides a loop counter for the state machine 1102 when it is evaluating the next bin list to process (in conjunction with the bin list selection unit 1110).

The Data logic unit 1112 is the data processing block of the binning unit 1069. It is able to increment pointers, merge attribute flags and format different data types for writing to external memory via the data cache 1115.

A region number unit 1116 computes a linear region number from the X and Y region co-ordinates outputted from the X/Y steppers 1108/1109. This number, together with the output of the data logic unit 1112 and state registers 1103, are used by an address compute unit 1113, to compute a memory address for bin list array entries.

The data cache 1115 is provided for decoupling all memory references from the external memory bus. It exploits the address coherence of the binning unit memory accesses to reduce the external memory bandwidth, and to reduce the stall time that would be cased by waiting for data to arrive.

The data cache 1115 has an address tag section 1114. This indicates to the binning unit 1069 whether any particular external memory access is a hit or a miss in the data cache. On miss, the binning unit 1069 is stalled until the required data packet is fetched from memory.

Processing Elements

Figure 11:
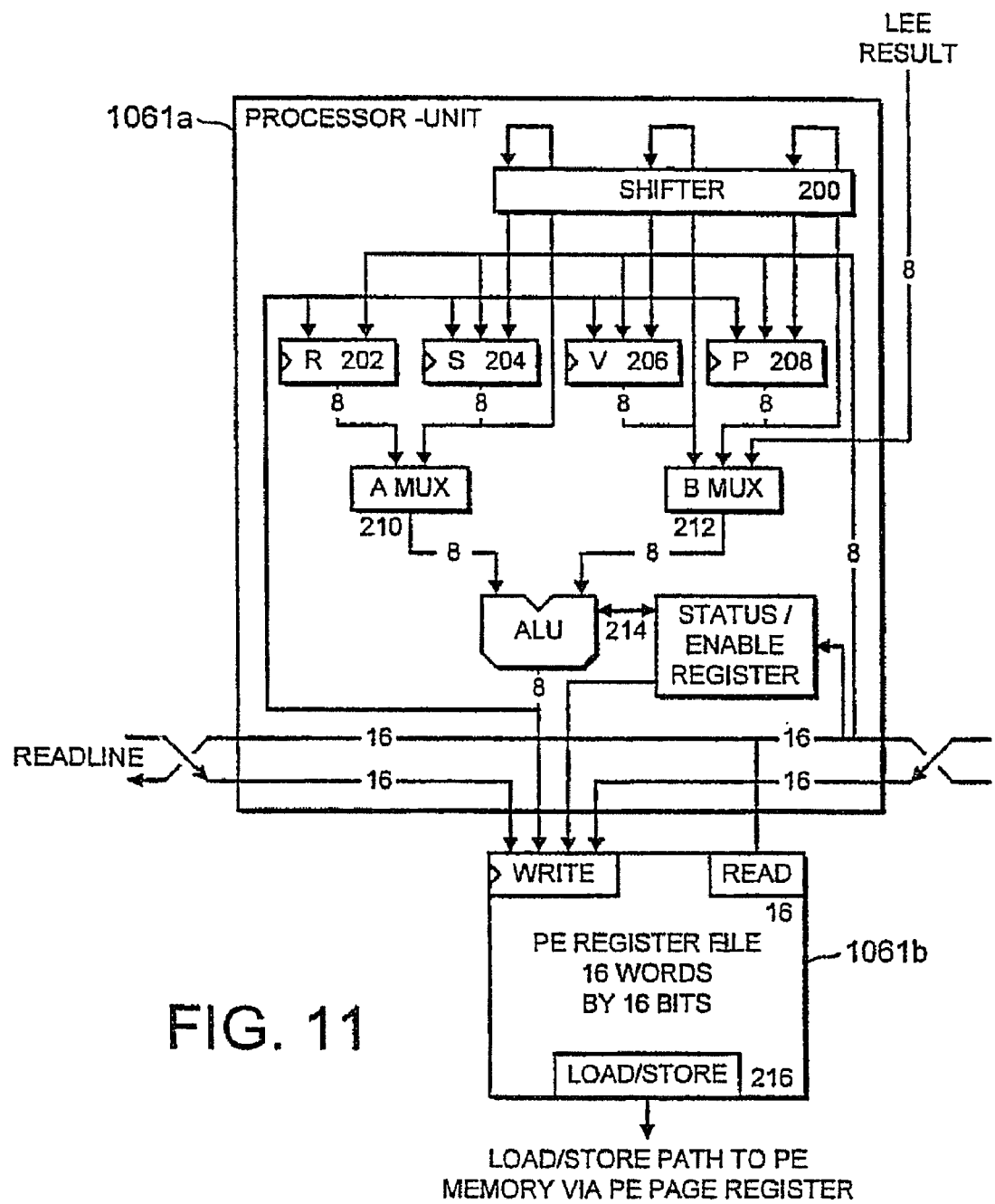
FIG. 11 is a block diagram of a processor unit of the processing block of FIG. 8.

FIG. 11 shows a processor unit 1061a and PE register file 1061b which form part of the processing element shown in FIGS. 3 and 8. The PE 1061 includes an arithmetic logic unit (alu) 214 which is connected to receive data values from a block of 8 bit registers 202, 204, 206, 208 (designated R, S, V and P) via multiplexers 210 and 212 (A and B).

The PE register file 1061b which operates to buffer data between the PE and its associated PE memory, and to store temporarily data on which the processor unit 1061a is processing.

The RSVP registers 202, 204, 206, 208 operate to supply operands to the alu 214. The A multiplexer 210 receives data values from the R and S registers and so controls which of those register values is supplied to the alu 214. The B multiplexer 212 is connected to receive data values from the V and P registers and also from the MEE 1062, and so controls which of those values is to be supplied to the alu.

The processor unit 1061a further includes a shifter 200 which can perform a left or right shift on the data output from the S, V and P registers.

The R register can hold its previous value, or can be loaded with a byte from the register file, or the result from the alu. The alu result is 10 bits wide, and so the R register can receive the first 8 bits (bits 7 to 0) or bits 9 to 2, for a Booth multiply step. Booth multiplication is a well known way of providing multiplication results in one clock cycle.

The S register can hold its previous value, or can be loaded with a shifted version of its previous value. The S register can also be loaded with the alu result, a bit from the register file or the low 2 bits from the alu concatenated with the high 6 bits of the S registers previous value (for the Booth multiply step).

The V and P registers can both be loaded with the alu result, or a byte from the register file. The lsb of the V register is used to determine the set of processor elements which are participating in MEE feedback transfer. The five low bits of the P register are used to modify the memory address in memory accesses.

Using four registers R, S, V and P provides the system with improved performance over previously known systems because any of the registers are able to provide data to the alu 214. In addition, any of the registers can be loaded with data from the PE register file 1061b, which improves the generality of the system, and provides better support for floating point operations. Since the R register input is never shifted, the R register can be used to store and modify the exponent of floating point numbers.

The alu 214 receives instructions from the array controller (not shown) and supplies its output to the PE register file 1061b. The PE register file 1061b is used to store data for immediate use by the PE, for example, the register file 1061b can store 16 words of 16 bits in length.

Data to be written to the register file is transferred via a write port, and data to be read from the register file is transferred via a read port. Data is transferred to and from the register file from the PE memory via a load/store port under the control of the load/store controller.

The PE register file 1061*b* can receive data to be stored through its write port in a number of ways: a 16 bit value can be received from the processor element which form the element=s left or right neighbour, a 16 bit value can be received from a status/enable register, or an 8 bit value can be received from the alu result. In the case that the alu result is supplied to the register file, the 8 bit value is copied into both the high and low bytes of the register file entry concerned.

The write port is controlled on the basis of the source of data, and is usually controlled by way of the contents of the enable stack. It is possible to force a register file write regardless of the enable stack contents.

The processor unit 1061*a* also includes an enable stack which is used to determine when the alu 214 can process data. The enable stack provides 8 enable bits which indicate if the alu can operate on the data supplied to it. In a preferred example, the alu 214 will only operate if all 8 bits are set to logical 1. A stack of enable bits is particularly useful when the alu is to perform nested conditional instructions. Such nested instructions tend to occur most often in IF, ELSE, ENDIF instruction sequences.

By providing an enable stack of multiple bits in hardware, it is possible to remove the need for software to save and load the contents of a single enable bit when the alu is processing a nested instruction sequences.

The read and write ports of the PE register file 1061*b* enable a 16 bit data word to be copied to the PE register file of at least one of the neighbouring PEs. The load and store operations can be issued in parallel with microcoded alu instructions from the array controller. The PE register file 1061*b* provides several performance advantages over previous systems in which the alu has directly accessed a memory device. The PE register file 1061*b* provides faster access to frequently used data values than a processor element to memory or memory to memory architecture can provide. In addition, there are no restrictions on the order in which data values are ordered in the register file, which further aids speed of processing and programming flexibility.

Figure 12:
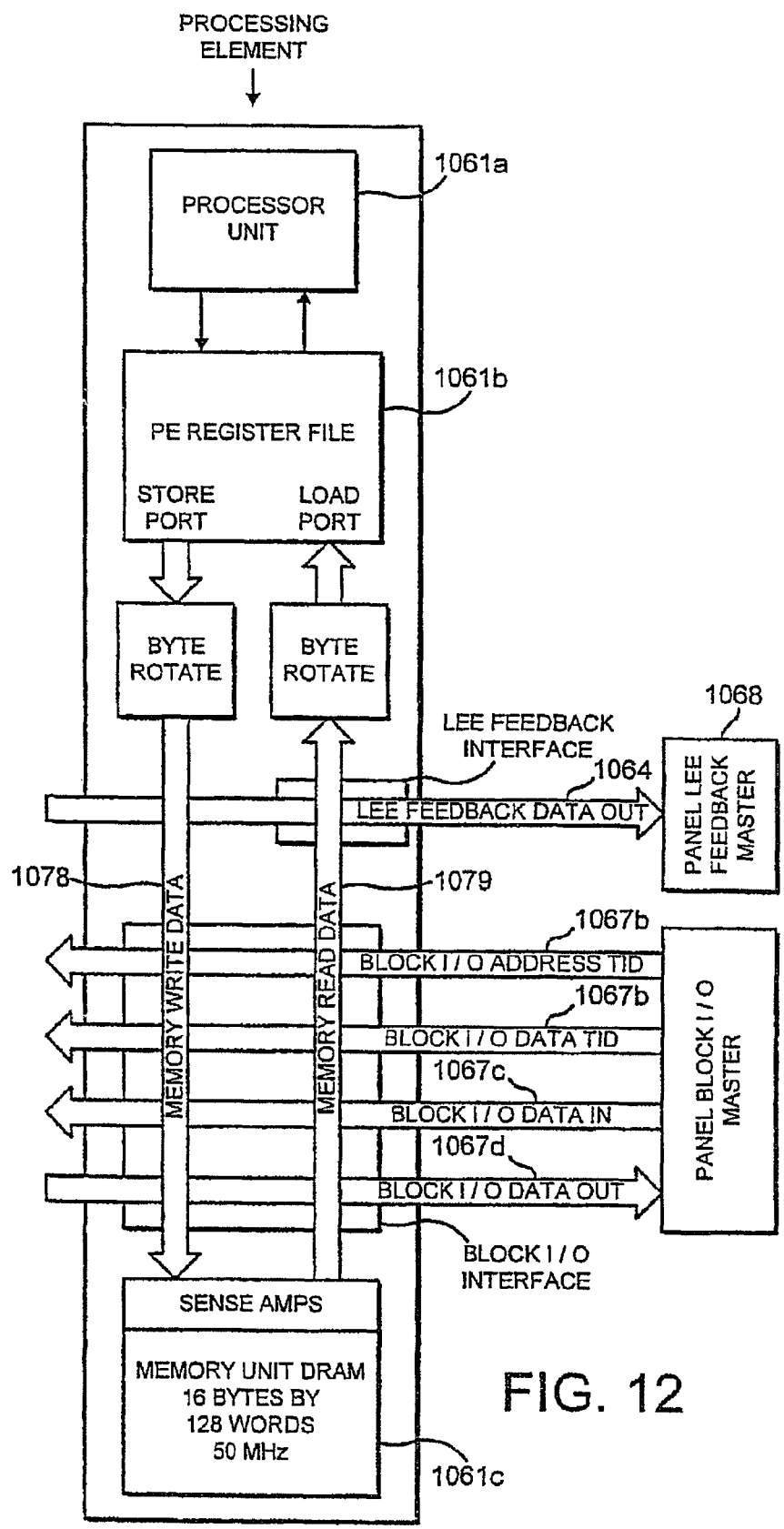
FIG. 12 is a block diagram illustrating a processing element interface.

FIG. 12 is a block diagram illustrating a processing element, and data input and output lines to that element. As previously described, the processing element includes a processor unit 1061*a*, a PE register file 1061*b*, and a PE memory unit 1061*c*. The memory unit 1061*c* is preferably DRAM which is able to store 128 pages of 16 bytes. Alternatively, other memory configurations could be used for the PE memory unit. Data items can be transferred between the PE register file 1061*b* and the PE memory unit 1061*c* by way of memory read data and memory write data lines 1078 and 1079.

In addition, data can be transferred out of the processor element, and indeed out of the processor block in which the element is situated, by way of a block I/O data out bus 1067*d*, and can be transferred into the processor block by way of a block I/O data in bus 1067*c*.

Address transaction ID and data transaction ID information can be transferred to the processor block by way of busses 1067*a* and 1067*b*. The MEE feedback data is transferred from the PE memory unit 1061*c* or the PE register file 1061*b* to the MEE feedback buffer (not shown) by way of a MEE feedback data out bus 1064.

Figure 13:
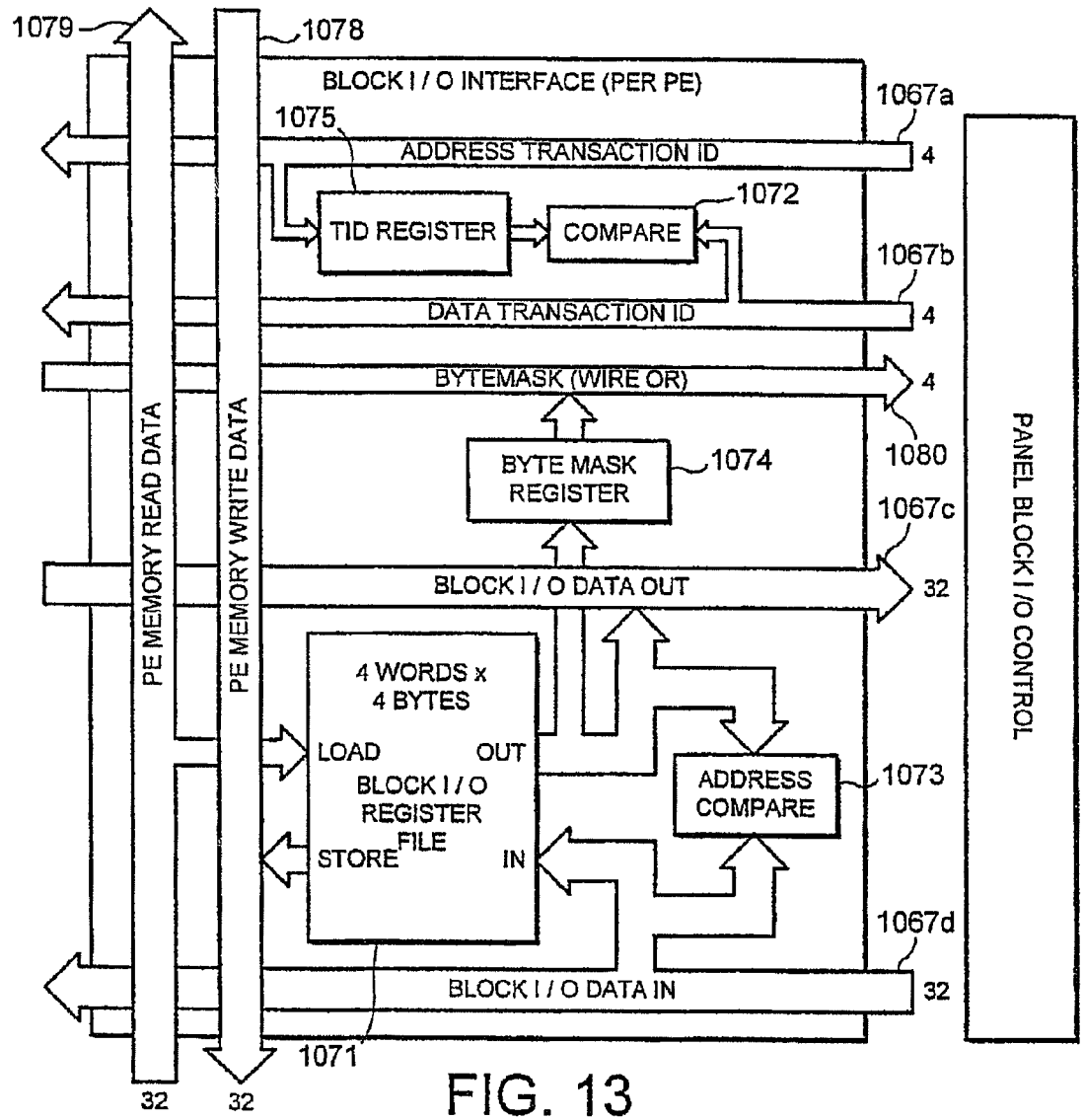
FIG. 13 is a block diagram illustrating a block I/O interface.

FIG. 13 shows the block I/O interface in more detail. PE memory read and write data buses 1078 and 1079 interface with a block I/O register file 1071 for transferring data between the register and the processing unit and the memory unit. Data to be read out from the processing element is output from the block I/O register file 1071 onto the block I/O data out bus 1067*c*, and data to be read into the processing element concerned is input to the block I/O register file 1071 from the block I/O in bus 1067*d*.

The processing elements that require access to memory indicate that this is the case by setting an indication flag or mark bit. The first such marked PE is then selected, and the memory address to which it requires access is transmitted to all of the processing elements of the processing block. The address is transmitted with a corresponding transaction ID. Those processing elements which require access (i.e. have the indication flag set) compare the transmitted address with the address to which they require access, and if the comparison indicates that the same address is to be accessed, those processing elements register the transaction ID for that memory access and clear the indication flag.

All those PEs requiring access to memory (including the selected PE) then compare the required address with the address transmitted on the block I/O inbus 1067*d*, by way of an address compare unit 1073. If the result of the address compare demonstrates that the selected address is required for use, then the byte mask is unset and the transaction ID for the memory access concerned is stored in a transaction ID register 1075. The address transaction ID is supplied on the address transaction ID bus 1067*a*. Later, the required data carrying the same transaction ID returned along the block I/O data inbus 1067*d*. Simultaneously, or just before the data is returned, the transaction ID is returned along the data transaction ID bus 1067*b* all of the processor elements compare the returned data transaction ID with transaction ID stored in the transaction ID register 1075 by means of comparator 1076. If the comparison indicates that the returned transaction ID is equivalent to the stored transaction ID, the data arriving on the block I/O data inbus 1067*d* is input into the PE register file 1061*b*. When the transaction ID is returned to the processing block, the processing elements compare the stored transaction ID with the incoming transaction ID, in order to recover the data.

Using transaction IDs in place of simply storing the accessed address information enables multiple memory accesses to be carried, and then returned in any order.

Figure 14:
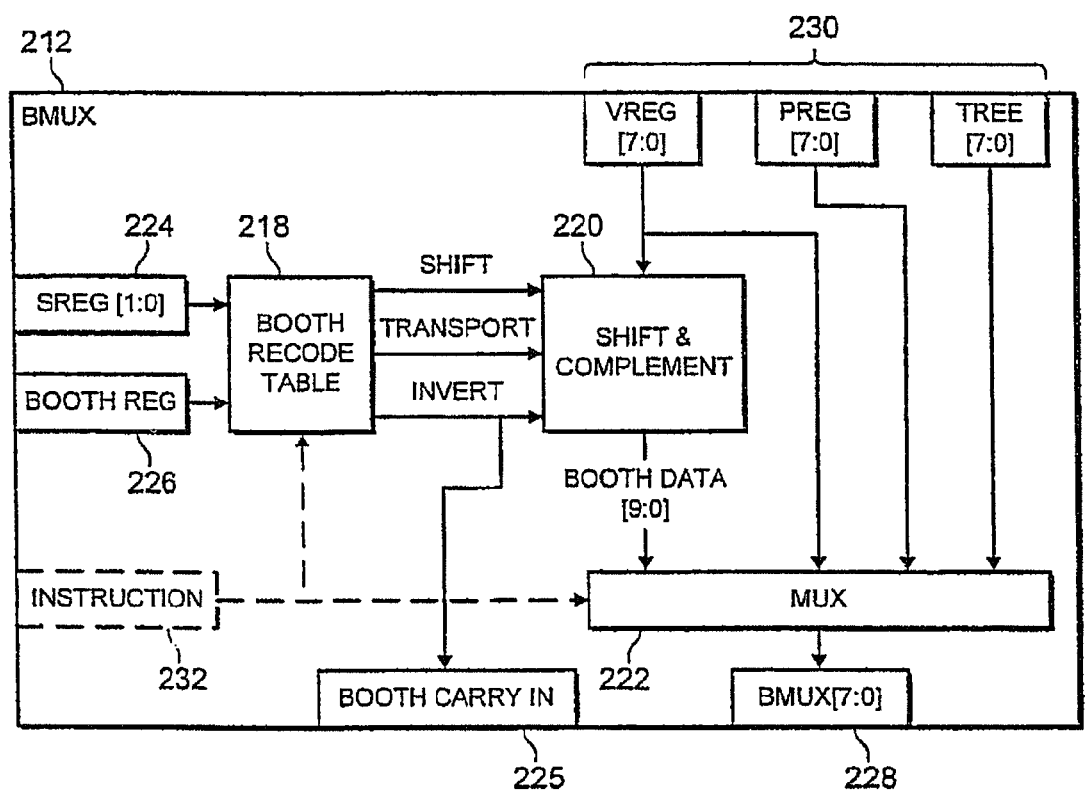
FIG. 14 is a block diagram of part of the processor unit of FIG. 11.

Booth multiplication is achieved using the B multiplexer 212, which is shown in more detail in FIG. 14. The B multiplexer 212 receives inputs 230 from the V and P registers and from the MEE 1602. The B multiplexer 212 includes a Booth recode table 218 and a shift and complement unit 220. The Booth recode table 218 receives inputs 224, 226 from the two least significant bits of the S register and from a Booth register (S reg and Boothreg). Booth recoding is based on these inputs and the Booth recode table transforms these bits into shift, transport and invert control bits which are fed to the shift and complement unit 220. The shift and complement unit 220 applies shift, transport and invert operations to the contents of the V register. The shift operation shifts the V register one bit to the left, shifting in a 0, and the transport and invert bits cause the possibly shifted result to be transported, inverted or zeroed or a combination of those.

Figure 15:
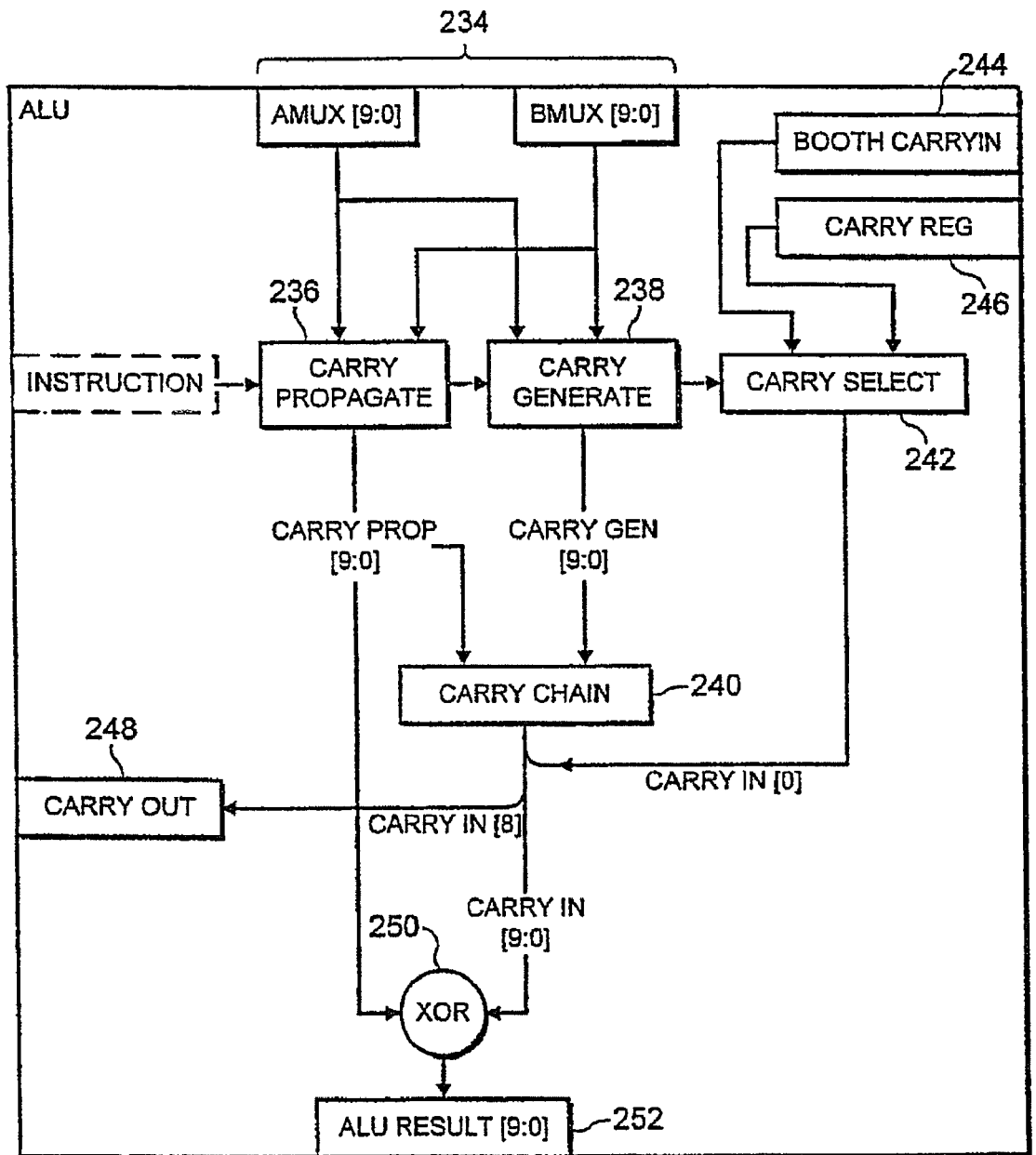
FIG. 15 is a block diagram of another part of the processor unit of FIG. 11.

FIG. 15 shows a block diagram of the alu 214 of the processor element shown in FIG. 13. The alu 214 receives 10 bit inputs 234 from the A and B multiplexers 210 and 212, and also receives inputs 244 and 246 from the BoothCarryIn and CarryReg registers. The alu 214 also receives instructions from the controller. The alu 214 includes a carry propagate unit 236, a carry generate unit 238 and a carry select unit 242.

The alu also includes an exclusive OR (XOR) gate 250 for determining the alu result output. A CarryChain unit 240 receives inputs from Carry propagate unit 236 and the carry generate unit 238, and outputs a result to the XOR gate 250.

The various units in the alu 214 operate to carry out instructions issued by the controller.

The invention claimed is:

1. A register score-boarding unit for use in an array controller for controlling the operation of a SIMD (single instruction multiple data) array of processing elements in which the processing elements are operably divided into a plurality of processing blocks, the processing blocks being operable to process respective groups of data items, the array controller comprising a processing element instruction sequencer for handling data processing instructions and a data transfer controller for handling data transfer instructions, the register score-boarding unit comprising:

means for maintaining the appearance of serial instruction execution while achieving parallel operation between the processing element instruction sequencer and the data transfer controller;

an enable stack to determine whether a processing element is permitted to process data supplied to it; and means to stall a load/store instruction, in response to an executing microcode-instruction that modifies the enable stack.

2. A unit as claimed in claim 1, provided on a single integrated circuit.

3. A graphical data processing system comprising a host general data processing apparatus and a register score-boarding unit as claimed in claim 1 for processing graphical data.

* * * * *